(12) United States Patent
Yu et al.

(10) Patent No.: US 8,891,889 B2
(45) Date of Patent: Nov. 18, 2014

(54) IMAGE ENCODING AND DECODING METHODS AND RELATED DEVICES

(71) Applicant: Huawei Technologies Co., Ltd., Shenzhen (CN)

(72) Inventors: Haoping Yu, Bridgewater, NJ (US); Xiaozhen Zheng, Shenzhen (CN); Sixin Lin, Shenzhen (CN); Jiantong Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/848,301

(22) Filed: Mar. 21, 2013

(65) Prior Publication Data

US 2013/0216146 A1  Aug. 22, 2013

Related U.S. Application Data

(63) Continuation of application No. PCT/CN2011/072730, filed on Apr. 13, 2011.

(51) Int. Cl.
*G06K 9/36* (2006.01)
*G06K 9/46* (2006.01)
*G06T 9/00* (2006.01)
*H04N 19/46* (2014.01)
*H04N 19/537* (2014.01)
*H04N 19/119* (2014.01)
*H04N 19/172* (2014.01)

(52) U.S. Cl.
CPC . *G06T 9/004* (2013.01); *G06T 9/00* (2013.01); *H04N 19/00545* (2013.01); *H04N 19/00612* (2013.01); *H04N 19/00072* (2013.01); *H04N 19/00266* (2013.01)
USPC .......................................... 382/233; 382/232

(58) Field of Classification Search
USPC ....................................................... 382/233
See application file for complete search history.

(56) References Cited

U.S. PATENT DOCUMENTS 6,956,974 B1  10/2005  Ito et al.
2004/0028282 A1*  2/2004  Kato et al. .................... 382/236
(Continued)

FOREIGN PATENT DOCUMENTS

CN  1278981 A  1/2001
CN  101273641 A  9/2008
(Continued)

OTHER PUBLICATIONS

Communication from a foreign counterpart application, International Application No. PCT/CN2011/072730, English Translation, International Search Report dated Jul. 7, 2011, 4 pages.
(Continued)

*Primary Examiner* — Vu Le
*Assistant Examiner* — Samah Beg
(74) *Attorney, Agent, or Firm* — Conley Rose, P.C.; Grant Rodolph; Nicholas K. Beaulieu

(57) ABSTRACT

Image encoding and decoding methods and related devices are provided. An image encoding and decoding method includes: for a sub-image block obtained by partitioning an image block, determining at least two position parameters, in which the at least two position parameters include a first position parameter and a second position parameter, the first position parameter identifies whether the sub-image block is a rectangle or not a rectangle, and the second position parameter identifies endpoint information of the sub-image block; determining an encoding sequence of the first position parameter and the second position parameter according to a partition manner of the image block; and encoding the at least two position parameters according to the determined encoding sequence.

30 Claims, 12 Drawing Sheets

(56) References Cited

U.S. PATENT DOCUMENTS

| | | | |
|---|---|---|---|
| 2004/0240745 A1* | 12/2004 | Sugimoto et al. | 382/236 |
| 2005/0012645 A1* | 1/2005 | Funakubo | 341/50 |
| 2009/0046781 A1* | 2/2009 | Moriya et al. | 375/240.12 |
| 2010/0189181 A1 | 7/2010 | Zheng et al. | |
| 2010/0195715 A1 | 8/2010 | Liu et al. | |
| 2010/0208827 A1 | 8/2010 | Divorra Escoda et al. | |
| 2011/0013849 A1 | 1/2011 | Saito | |
| 2011/0201811 A1 | 8/2011 | Chen et al. | |
| 2012/0177106 A1 | 7/2012 | Divorra Escoda et al. | |
| 2012/0224777 A1* | 9/2012 | Kim et al. | 382/238 |
| 2012/0288007 A1 | 11/2012 | Lee et al. | |
| 2013/0107959 A1 | 5/2013 | Park et al. | |
| 2013/0129237 A1 | 5/2013 | Yie et al. | |

FOREIGN PATENT DOCUMENTS

| | | | |
|---|---|---|---|
| CN | 101389021 A | 3/2009 | |
| CN | 102223526 A | 10/2010 | |
| JP | 10234041 A | 9/1998 | |
| JP | 2004274371 A | 9/2004 | |
| JP | 2005-277968 * | 10/2005 | H04N 7/32 |
| WO | 2009051719 A2 | 4/2009 | |
| WO | 2011068360 A2 | 6/2011 | |

OTHER PUBLICATIONS

Communication from a foreign counterpart application, International Application No. PCT/CN2011/072730, English Translation, Written Opinion of the International Searching Authority dated Jul. 7, 2011, 4 pages.

Communication from a foreign counterpart application, Chinese Application No. 201010150083.4, Chinese Search Report dated Sep. 22, 2012, 2 pages.

Office Action dated Jul. 24, 2013, 12 pages, U.S. Appl. No. 13/848,308, filed Mar. 21, 2013.

Foreign Communication From a Counterpart Application, European Application No. 11768431.6, Extended European Search Report dated Nov. 22, 2013, 7 pages.

Divorra, O., et al., "Geometry-Adaptive Block Pardoning," ITU—Telecommunications Standardization Sector, Study Group 16, Question 6, Video Coding Experts Group (VCEG), 32nd Meeting: San Jose, CA, VCEG-AF10, Apr. 2007, 8 pages.

Vermeirsch, K., et al., "New Macroblock Bipartitioning Modes for Inter Coding," ITU—Telecommunications Standardization Sector, Study Group 16, Question 6, Video Coding Experts Group (VCEG), 34 Meeting: Antalya, Turkey, Jan. 12-13, 2008, VCEG-AH25, 8 pages.

Zheng, X., et al., "Flexible Macroblock Partition," JCTVC-A029, Hisilicon Technologies Co., Ltd, Apr. 15-23, 2010, 10 pages.

Notice of Allowance dated Feb. 13, 2014, 19 pages, U.S. Appl. No. 13/848,308, filed Mar. 21, 2013.

* cited by examiner

For a sub-image block obtained by partitioning an image block, determine at least two position parameters, where the at least two position parameters include a first position parameter and a second position parameter, the absolute value of the first position parameter and the absolute value of the second position parameter each identify the distance from an endpoint of a boundary of a sub-image block to a corresponding reference endpoint, the boundary of the sub-image block is not at a boundary of the image block, the corresponding reference endpoint is an endpoint on the image block that is located on a same boundary as the endpoint of the boundary of the sub-image block, and the sign of the first position parameter and the sign of the second position parameter jointly identify the position of the sub-image block in the image block 401A Encode the at least two position parameters 402A

FIG. 4A

Acquire a bitstream, and decode at least two position parameters from the bitstream, where the at least two position parameters include a first position parameter and a second position parameter, the absolute value of the first position parameter and the absolute value of the second position parameter each identify the distance from an endpoint of a boundary of a sub-image block to a corresponding reference endpoint, the boundary of the sub-image block is not at a boundary of the image block, the corresponding reference endpoint is an endpoint on the image block that is located on one same boundary as the endpoint of the boundary of the sub-image block, and the sign of the first position parameter and the sign of the second position parameter jointly identify the position of the sub-image block in the image block 401B Determine, according to the at least two position parameters, sub-image block obtained by partitioning an image block 402B

FIG. 4B

IMAGE ENCODING AND DECODING METHODS AND RELATED DEVICES

CROSS-REFERENCE TO RELATED APPLICATION

This application is a continuation of International Application No. PCT/CN2011/072730, filed on Apr. 13, 2011, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications technologies, and in particular, to image encoding and decoding methods and related devices.

BACKGROUND

To reduce the bandwidth required for transferring video data as much as possible, multiple video compression methods may be selected to compress video data. The video compression methods include: intra-frame compression and inter-frame compression. Currently an inter-frame compression method based on motion estimation is often selected. Specifically, the process that an inter-frame compression method is selected at an image encoder to compress and encode an image includes: an encoder partitions an image block to be encoded into several sub-image blocks of equal sizes, for each sub-image block, searches a reference image for an image block that matches with the current sub-image block most as a prediction block, performs subtraction on corresponding pixel values of the sub-image block and the prediction block to obtain a residual, performs entropy encoding on a value obtained after transform and quantization of the residual, and in the end sends to a decoder a bitstream obtained through entropy encoding and motion vector information together. The motion vector information indicates a position difference between the current sub-image block and the prediction block. At the decoder for an image, an entropy encoded bitstream is first acquired to perform entropy decoding to obtain a corresponding residual and corresponding motion vector information, a corresponding matching image block (namely, the prediction block) is then acquired from the reference image according to the motion vector information, and the values of corresponding pixel points in the image block and the residual value are added to obtain a current sub-image block.

During the process, an encoder needs to partition an image block to be encoded into some sub-image blocks. For example, a horizontal partition manner or a vertical partition manner may be selected to partition an image block into two rectangular sub-image blocks. Alternatively, a partition manner from lower left to upper right or a partition manner from lower right to upper left may be selected to partition an image block into two sub-image blocks, in which one sub-image block is a triangle. In the prior art, two parameters are selected for identification, in which a numerical value such as 1, 2, 3, 4, . . . , is selected for one parameter to identify a partition manner, for example, 1 identifies horizontal partition, 2 identifies vertical partition, 3 identifies a partition manner at 45 degrees from lower left to upper right, 4 identifies a partition manner at 45 degrees from lower right to upper left, 5 identifies a partition manner at 30 degrees from lower left to upper right, 6 identifies a partition manner at 30 degrees from lower right to upper left, and the like; the other parameter identifies the position of a sub-image block endpoint.

The prior art has the following disadvantages.

In the two parameters selected in the prior art, the first parameter identifies a partition manner, and as at least 4 partition manners (horizontal partition, vertical partition, partition at 45 degrees from lower left to upper right, and partition at 45 degrees from lower right to upper left) need to be identified, the parameter needs at least two bits. The bit count of the parameter for identifying a sub-image block obtained by partitioning an image block is the sum of the bit count of the first parameter and the bit count of the second parameter, so that the number of bits occupied thereof is large.

The first parameter identifies a partition manner. A different numerical value is needed to identify a partition at a different angle, for example, 4 identifies the partition manner at 45 degrees from lower right to upper left, 5 identifies a partition manner at 30 degrees from lower left to upper right, 6 identifies a partition manner at 30 degrees from lower right to upper left, and the like. Generally speaking, the first parameter does not select many bits, so that only a limited number of angle values are capable of being identified, resulting in limited types of partition when a partition manner from lower right to upper left or from lower left to upper right is selected.

SUMMARY

The embodiments of the present invention provide image encoding and decoding methods and related devices, so that the bit count needed for a parameter for identifying a sub-image block obtained by partitioning an image block is reduced or the types of partition are not limited when a partition manner from lower right to upper left or from lower left to upper right is selected.

Accordingly, an embodiment of the present invention provides:

An image encoding method includes: for a sub-image block obtained by partitioning an image block, determining at least two position parameters, where the at least two position parameters include a first position parameter and a second position parameter, the first position parameter identifies whether the sub-image block is a rectangle or not a rectangle, and the second position parameter identifies endpoint information of the sub-image block; determining an encoding sequence of the first position parameter and the second position parameter according to a partition manner of the image block; and encoding the at least two position parameters according to the determined encoding sequence.

An image encoding method includes: for a sub-image block obtained by partitioning an image block, determining at least two position parameters, where the at least two position parameters include a first position parameter and a second position parameter, the absolute value of the first position parameter and the absolute value of the second position parameter each identify the distance from an endpoint of a boundary of the sub-image block to a corresponding reference endpoint, the boundary of the sub-image block is not on a boundary of the image block, the corresponding reference endpoint is an endpoint on the image block that is located on a same boundary as the endpoint of the boundary of the sub-image block, the sign of the first position parameter and the sign of the second position parameter jointly identify the position of the sub-image block in the image block; and encoding the at least two position parameters.

An image decoding method includes: acquiring a bitstream, and decoding at least two position parameters from the bitstream, where the at least two position parameters include a first position parameter and a second position parameter, the first position parameter identifies whether a sub-image block obtained by partitioning an image block is a rectangle or not a rectangle, and the second position parameter identifies endpoint information of the sub-image block; and determining, according to the at least two position parameters and a decoding sequence of the at least two position parameters, information of the sub-image block obtained by partitioning the image block.

An image decoding method includes: acquiring a bitstream, and decoding at least two position parameters from the bitstream, where the at least two position parameters include a first position parameter and a second position parameter, the absolute value of the first position parameter and the absolute value of the second position parameter each identify the distance from an endpoint of a boundary of the sub-image block to a corresponding reference endpoint, the boundary of the sub-image block is not on a boundary of the image block, the corresponding reference endpoint is an endpoint on the image block that is located on a same boundary as the endpoint of the boundary of the sub-image block, and the sign of the first position parameter and the sign of the second position parameter jointly identify the position of the sub-image block in the image block; and determining, according to the at least two position parameters, information of the sub-image block obtained by partitioning the image block.

An image encoding device includes: a parameter determination unit configured to: for a sub-image block obtained by partitioning an image block, determine at least two position parameters, where the at least two position parameters include a first position parameter and a second position parameter, the first position parameter identifies whether the sub-image block is a rectangle or not a rectangle, and the second position parameter identifies endpoint information of the sub-image block; an encoding sequence determination unit configured to determine an encoding sequence of the first position parameter and the second position parameter according to a partition manner of the image block; and an encoding unit configured to encode the at least two position parameters according to the determined encoding sequence.

An image encoding device includes: a parameter determination unit configured to: for a sub-image block obtained by partitioning an image block, determine at least two position parameters, where the at least two position parameters include a first position parameter and a second position parameter, the absolute value of the first position parameter and the absolute value of the second position parameter each identify the distance from an endpoint of a boundary of the sub-image block to a corresponding reference endpoint, the boundary of the sub-image block is not on a boundary of the image block, the corresponding reference endpoint is an endpoint on the image block that is located on a same boundary as the endpoint of the boundary of the sub-image block, and the sign of the first position parameter and the sign of the second position parameter jointly identify the position of the sub-image block in the image block; and an encoding unit configured to encode the at least two position parameters.

An image decoding device includes: a decoding unit configured to acquire a bitstream, and decode at least two position parameters from the bitstream, where the at least two position parameters include a first position parameter and a second position parameter, the first position parameter identifies whether a sub-image block obtained by partitioning an image block is a rectangle or not a rectangle, and the second position parameter identifies endpoint information of the sub-image block; and a sub-image block determination unit configured to determine, according to the at least two position parameters and a decoding sequence of the at least two position parameters, information of the sub-image block obtained by partitioning the image block.

An image decoding device includes: a decoding unit configured to acquire a bitstream, and decode at least two position parameters from the bitstream, where the at least two position parameters include a first position parameter and a second position parameter, the absolute value of the first position parameter and the absolute value of the second position parameter each identify the distance from an endpoint of a boundary of the sub-image block to a corresponding reference endpoint, the boundary of the sub-image block is not on a boundary of the image block, the corresponding reference endpoint is an endpoint on the image block that is located on a same boundary as the endpoint of the boundary of the sub-image block, and the sign of the first position parameter and the sign of the second position parameter jointly identify the position of the sub-image block in the image block; and a sub-image block determination unit configured to determine, according to the at least two position parameters, information of the sub-image block obtained by partitioning the image block.

An embodiment of the present invention selects at least two position parameters to identify a sub-image block obtained by partitioning an image block, in which the first position parameter identifies whether the sub-image block is a rectangle or not a rectangle, the second position parameter identifies endpoint information of the sub-image block; as the first position parameter only identifies whether the sub-image block is a rectangle or not a rectangle, the first position parameter may select one bit, so that the bit count needed for a parameter for identifying a sub-image block obtained by partitioning an image block is reduced.

Another embodiment of the present invention selects at least two position parameters to identify a sub-image block obtained by partitioning an image block, in which the absolute values of the two position parameters identify the distance from an endpoint of a boundary of the sub-image block to a corresponding reference endpoint, the boundary of the sub-image block is not on a boundary of the image block, the signs of the two position parameters jointly identify the position of the sub-image block in the image block, and by using the two position parameters, instead of being limited to an angle like 45 degrees, any partition type may be identified when a partition manner from lower right to upper left or from lower left to upper right is selected.

BRIEF DESCRIPTION OF THE DRAWINGS

To describe the technical solutions in the embodiments of the present invention more clearly, the following briefly introduces the accompanying drawings for describing the embodiments. Apparently, the accompanying drawings in the following description show merely some embodiments of the present invention, and persons of ordinary skill in the art may still derive other drawings from the accompanying drawings without creative efforts.

FIG. 4A is a flow chart of an image encoding method provided in another embodiment of the present invention;

FIG. 4B is a flow chart of an image decoding method provided in another embodiment of the present invention;

DETAILED DESCRIPTION

Figure 1A:
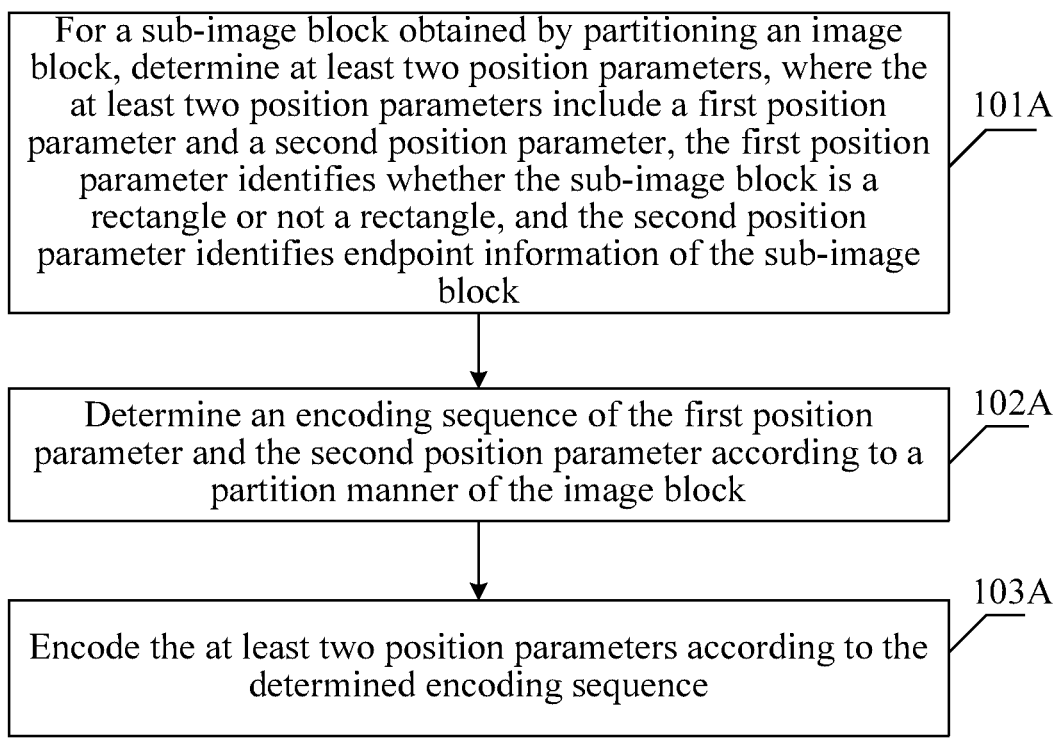
FIG. 1A is a flow chart of an image encoding method provided in an embodiment of the present invention.

Referring to FIG. 1A, an embodiment of the present invention provides an image encoding method, and the method includes:

Step 101A: For a sub-image block obtained by partitioning an image block, determine at least two position parameters, where the at least two position parameters include a first position parameter and a second position parameter, the first position parameter identifies whether the sub-image block is a rectangle or not a rectangle, and the second position parameter identifies endpoint information of the sub-image block.

Step 102A: Determine an encoding sequence of the first position parameter and the second position parameter according to a partition manner of the image block.

Before step 101A, an image encoder partitions the image block. If the image encoder allocates each of the pixel points whose vertical coordinate is smaller than or equal to a first threshold on the image block to one sub-image block and whose vertical coordinate is greater than the first threshold to another sub-image block. Alternatively, the image encoder can allocate each of the pixel points whose vertical coordinate is smaller than a first threshold on the image block to one sub-image block and whose vertical coordinate is greater than or equal to the first threshold to another sub-image block. Here, the first position parameter is a first-type numerical value, and identifies that the sub-image block is a rectangle. In the step, the image encoder determines that the encoding sequence of the first position parameter and the second position parameter is that the first position parameter precedes the second position parameter. The second position parameter indicates the difference obtained by subtracting the vertical coordinate of a first pixel point from the first threshold. If each of the pixel points whose horizontal coordinate is smaller than or equal to a second threshold in the image block is allocated to one sub-image block, and alternatively, each of the pixel points whose horizontal coordinate is greater than or equal to the second threshold is allocated to another sub-image block. Here, the first position parameter is the first-type numerical value, and the first position parameter identifies that the sub-image block is a rectangle. In the step, the image encoder determines that an encoding sequence of the first position parameter and the second position parameter is that the second position parameter precedes the first position parameter. The second position parameter indicates the difference obtained by subtracting the horizontal coordinate of a second pixel point from the second threshold. In the embodiment and subsequent embodiments, the first threshold and the second threshold may be obtained after the analysis of the contents of an image and may also be preset numerical values, and the first pixel point and the second pixel point may be preset pixel points. In the subsequent embodiments, horizontal partition and vertical partition performed by an image encoder on an image block and corresponding parameter indication manners are described in detail, the first position parameter is 0 in the subsequent embodiments, and the second position parameter is pos in the subsequent embodiments.

That is, when a horizontal partition manner or a vertical partition manner is selected, it is determined that the first position parameter is the first-type numerical value. The first-type numerical value indicates that a sub-image block obtained by partitioning an image block is a rectangle. According to intersection information of a rectangle boundary and a boundary of an image block, a second position parameter is determined; and the rectangle boundary is not on the boundary of the image block. In the step, select an encoding sequence of the first position parameter and the second position parameter is determined according to which one of a horizontal partition manner and a vertical partition manner is selected.

When a partition manner at 45 degrees from upper right to lower left or a partition manner at 45 degrees from upper left to lower right is selected, the absolute value of the first position parameter is a second-type numerical value, and the absolute value of the first position parameter indicates that one sub-image obtained by partitioning a block image block is a triangle. When the partition manner at 45 degrees from upper right to lower left is selected, the sign of the first position parameter indicates that the triangle is at the upper left corner or the lower right corner in the image block, the second position parameter indicates endpoint information of the triangle boundary, and the triangle boundary is not on the boundary of the image block. When the partition manner at 45 degrees from upper left to lower right is selected, the sign of the first position parameter indicates that the triangle is at the lower left corner or the upper right corner in the image block, the second position parameter indicates endpoint information of the triangle boundary, and the triangle boundary is not on the boundary of the image block. In the step, the image encoder, according to which one of the partition manner at 45 degrees from upper right to lower left and the partition manner at 45 degrees from upper left to lower right is selected, determines an encoding sequence of the first position parameter and the second position parameter. In the subsequent embodiments, such partition manner, parameter indication manner, and encoding sequences are described in detail. In the subsequent embodiments, the first position parameter is N, the second position parameter is pos, and for example, the absolute value of N is 1, so that encoding sequences (1, pos), (pos, 1), (−1, pos), and (pos, −1) are capable of indicating four positions of the triangle in an image block, in which (1, pos) indicates that the 1 is encoded first, and then the pos.

Alternatively, when a partition manner at 45 degrees from upper right to lower left or a partition manner at 45 degrees from upper left to lower right is selected, the first position parameter is a second-type numerical value, and the first position parameter indicates that one sub-image obtained by partitioning a block image block is a triangle. When the partition manner at 45 degrees from upper right to lower left is selected, the sign of the second position parameter indicates that the triangle is at the upper left corner or the lower right corner in the image block, the absolute value of the second position parameter indicates endpoint information of the triangle boundary, and the triangle boundary is not on the boundary of the image block. When the partition manner at 45 degrees from upper left to lower right is selected, the sign of the second position parameter indicates that the triangle is at the lower left corner or the upper right corner in the image block, the absolute value of the second position parameter indicates endpoint information of the triangle boundary, and the triangle boundary is not on the boundary of the image block. In the step, the image encoder, according to which one of the partition manner at 45 degrees from upper right to lower left and the partition manner at 45 degrees from upper left to lower right is selected, determines an encoding sequence of the first position parameter and the second position parameter. In the subsequent embodiments, such partition manner and parameter indication manner are described in detail in the following. In the subsequent embodiments, the first position parameter is N, the absolute value of the second position parameter is pos, and for example, N is 1, so that the encoding sequences (1, +|pos|), (+|pos|, 1), (1, −|pos|), and (−|pos|, 1) are capable of indicating four positions of the triangle in the image block, in which (1, +|pos|) indicates that 1 is encoded first, and then the +|pos|.

The first-type numerical value and the second-type numerical value are different. For example, the first-type numerical value is 0, whereas the second-type numerical value is a non-zero value.

Step 103A: Encode the at least two position parameters according to the determined encoding sequence.

When the horizontal partition manner, vertical partition manner, partition manner at 45 degrees from upper right to lower left or partition manner at 45 degrees from upper left to lower right is selected and encoding sequences (1, +|pos|), (+|pos|, 1), (1, −|pos|), (−|pos|, 1) are selected, in the step, the image encoder encodes the first position parameter separately, encodes the absolute value of the second position parameter separately, and encodes the sign of the second position parameter separately by using 1 bit.

If the partition manner at 45 degrees from upper right to lower left or partition manner at 45 degrees from upper left to lower right is selected and encoding sequences (1, pos), (pos, 1), (−1, pos), and (pos, −1) are selected, in the step, the image encoder encodes the absolute value of the first position parameter separately, encodes the second position parameter separately, and encodes the sign of the first position parameter separately by using 1 bit.

An embodiment of the present invention uses at least two position parameters to identify a sub-image block obtained by partitioning an image block, in which the first position parameter identifies whether the sub-image block is a rectangle or not a rectangle, the second position parameter identifies endpoint information of the sub-image block; as the first position parameter only identifies whether the sub-image block is a rectangle or not a rectangle, the first position parameter may use one bit, so that the bit count needed for a parameter for identifying a sub-image block obtained by partitioning an image block is reduced.

Figure 1B:
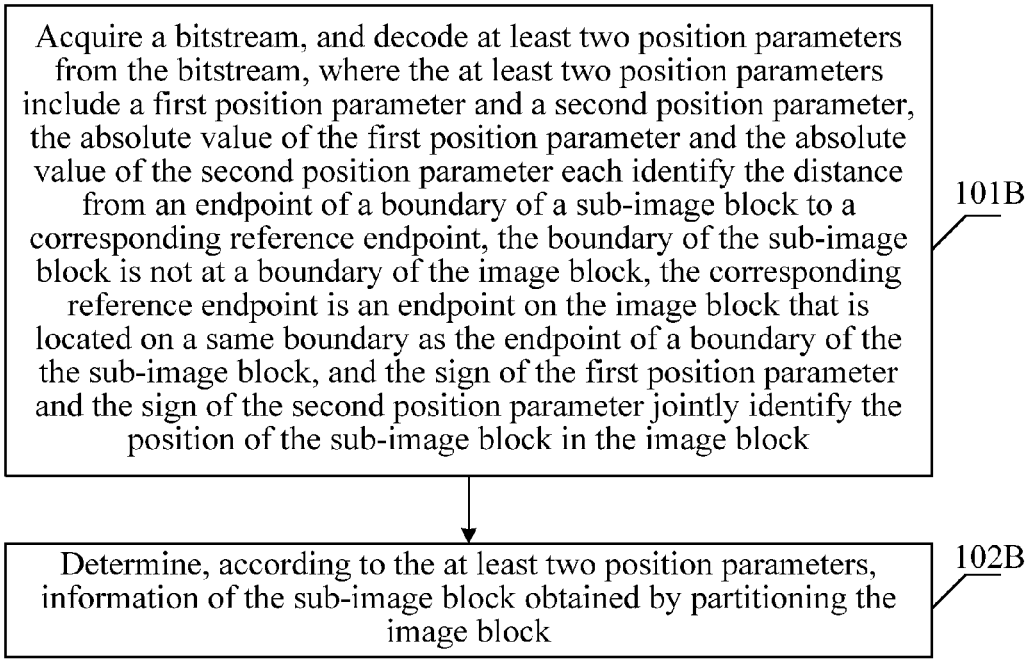
FIG. 1B is a flow chart of an image decoding method provided in an embodiment of the present invention.

Referring to FIG. 1B, an embodiment of the present invention provides an image decoding method, and the method includes:

101B: Acquire a bitstream, and decode at least two position parameters from the bitstream, where the at least two position parameters include a first position parameter and a second position parameter, the absolute value of the first position parameter and the absolute value of the second position parameter each identify the distance from an endpoint of a boundary of the sub-image block to a corresponding reference endpoint, the boundary of the sub-image block is not on a boundary of the image block, the corresponding reference endpoint is an endpoint on the image block that is located on a same boundary as the endpoint of the boundary of the sub-image block, and the sign of the first position parameter and the sign of the second position parameter jointly identify the position of the sub-image block in the image block.

102B: Determine, according to the at least two position parameters, information of the sub-image block obtained by partitioning the image block.

The information of the sub-image block includes information such as the partition manner of an image block, the position of a sub-image block in an image block, and which pixel points are included in the sub-image block.

Specifically, when the decoding sequence of the at least two position parameters is that the first position parameter is decoded prior to the second position parameter and the first position parameter is a preset first-type numerical value, the second position parameter indicates the difference obtained by subtracting the vertical coordinate of the first pixel point from the first threshold; and the determined sub-image block obtained by partitioning the image block includes: a sub-image block with each pixel point whose vertical coordinate is smaller than or equal to a first threshold and a sub-image block with each pixel point whose vertical coordinate is greater than or equal to the first threshold. When the decoding sequence of the at least two position parameters is that the second position parameter is decoded prior to the first position parameter and the first position parameter is a preset first-type numerical value, the second position parameter indicates the difference obtained by subtracting the horizontal coordinate of the second pixel point from the second threshold, and the determined sub-image block obtained by partitioning an image block includes: one sub-image block with each pixel point whose horizontal coordinate is smaller than or equal to a second threshold and one sub-image block with each pixel point whose horizontal coordinate is greater than or equal to the second threshold.

When the absolute value of the first position parameter is a preset second-type numerical value, it is determined that one sub-image block obtained by partitioning an image block is a triangle; according to a decoding sequence of the at least two position parameters, it is determined which one of the partition manner at 45 degrees from upper right to lower left and the partition manner at 45 degrees from upper left to lower right is selected for the image block; when the partition manner at 45 degrees from upper right to lower left is selected, it is determined that the triangle is located at the upper left corner or the lower right corner in the image block according to the sign of the first position parameter. When the partition manner at 45 degrees from upper left to lower right is selected, it is determined that the triangle is located at the lower left corner or the upper right corner in the image block according to the sign of the first position parameter, the endpoint information of the triangle boundary is determined according to the position of the triangle in the image block and the second position parameter, where the triangle boundary is not on the boundary of the image block.

Alternatively, according to the at least two position parameters and a decoding sequence of the at least two position parameters, the determining the sub-image block obtained by partitioning an image block includes the following: when the first position parameter is a preset second-type numerical value, it is determined that one sub-image block obtained by partitioning an image block is a triangle; according to the decoding sequence of the at least two position parameters, it is determined which one of the partition manner at 45 degrees from upper right to lower left and the partition manner at 45 degrees from upper left to lower right is selected for the image block; when the partition manner at 45 degrees from upper right to lower left is selected, it is determined that the triangle is located at the upper left corner or the lower right corner in the image block according to the sign of the second position parameter; when the partition manner at 45 degrees from upper left to lower right is selected, it is determined that the triangle is located at the lower left corner or the upper right corner in the image block according to the sign of the second position parameter; endpoint information of the triangle boundary is determined according to the position of the triangle in the image block and the absolute value of the second position parameter, where the triangle boundary is not on the boundary of the image block.

The embodiment selects at least two position parameters to identify a sub-image block obtained by partitioning an image block, in which the first position parameter identifies whether the sub-image block is a rectangle or not; the second position parameter identifies endpoint information of the sub-image block; as the first position parameter only identifies whether the sub-image block is a rectangle or not a rectangle, the first position parameter may select one bit, so that the bit count needed for a parameter for identifying a sub-image block obtained by partitioning an image block is reduced.

Figure 2:
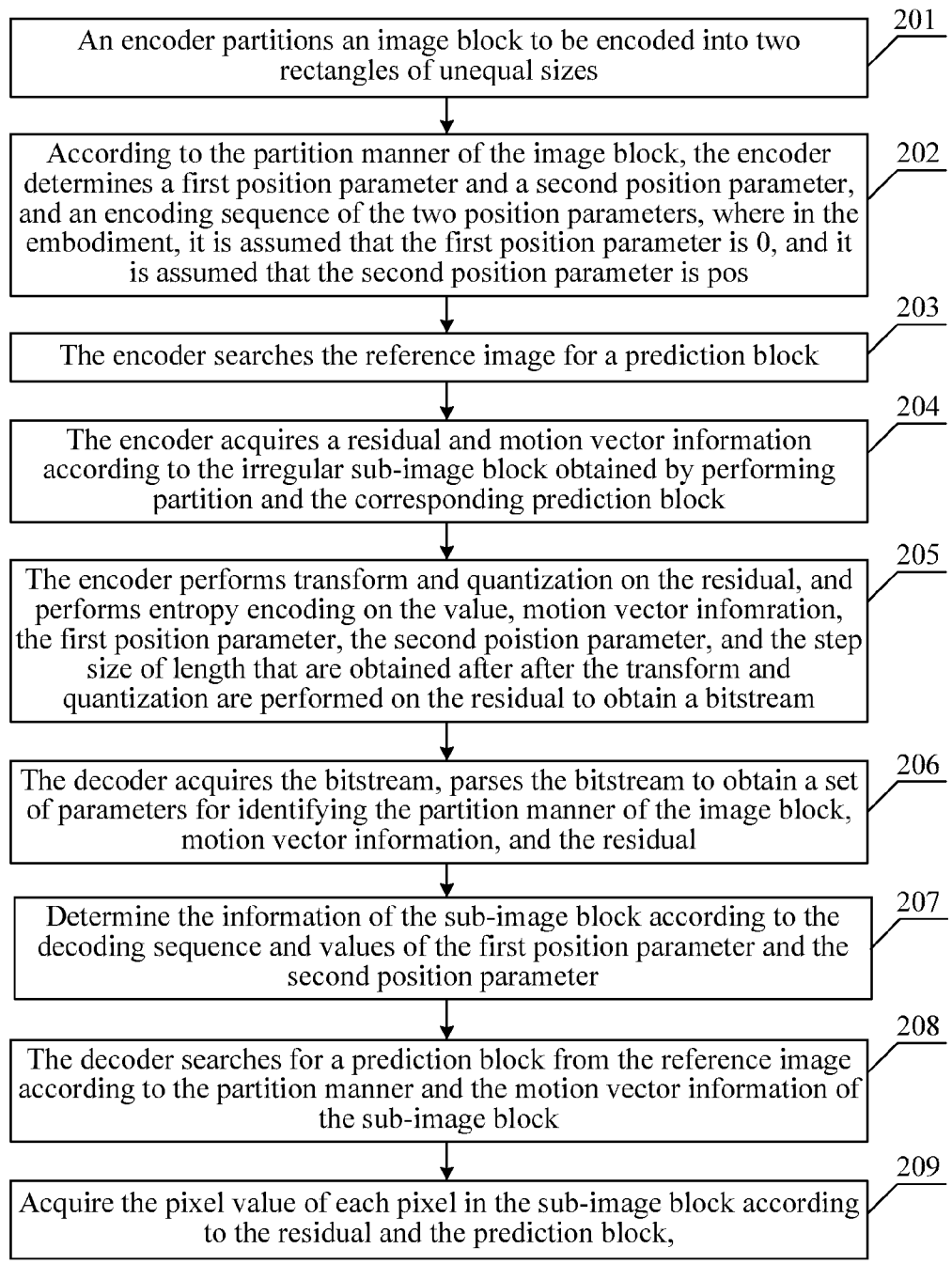
FIG. 2 is a flow chart of an image encoding and decoding method based on horizontal partition or vertical partition provided in an embodiment of the present invention.

Referring to FIG. 2, an embodiment of the present invention provides an image encoding and image decoding method, in the embodiment, an image block to be encoded is partitioned into two rectangles of unequal sizes, and the method specifically includes:

Step 201: An encoder, according to the texture of an image, the boundary of an object, and the background boundary of an image, partitions an image block to be encoded into two rectangles of unequal sizes.

In the step, two partition manners are provided: horizontal partition and vertical partition.

Specifically, the horizontal partition is performed on the image block to be encoded is to allocate each of the pixel points whose horizontal coordinate is smaller than or equal to a first threshold in the image block to one irregular sub-image block, and allocate each of the pixel points whose horizontal coordinate is greater than or equal to the first threshold to another irregular sub-image block. Similarly, the vertical partition is performed on the image block to be encoded is to allocate each of the pixel points whose vertical coordinate is smaller than or equal to a second threshold in the image block to one irregular sub-image block, and allocate each of the pixel points whose vertical coordinate is greater than or equal to the second threshold to another irregular sub-image block. The first threshold and the second threshold may be obtained after the analysis of the contents of an image and may also be preset numerical values.

Step 202: According to the partition manner of the image block, the encoder determines a first position parameter and a second position parameter, and an encoding sequence of the two position parameters, where in the embodiment, it is assumed that the first position parameter is 0, and it is assumed that the second position parameter is pos.

Figure 3A:
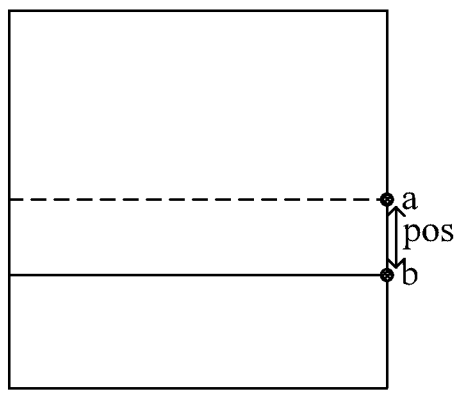
FIG. 3A is a schematic view of horizontal partition provided in an embodiment of the present invention.
Figure 3B:
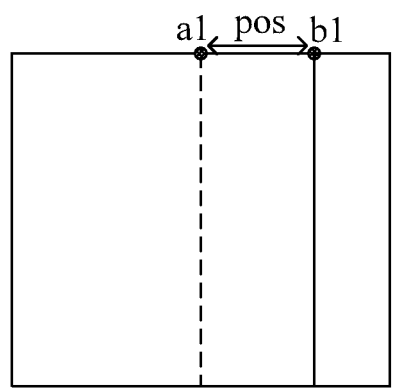
FIG. 3B is a schematic view of vertical partition provided in an embodiment of the present invention.

That is, when the horizontal partition manner or the vertical partition manner is selected, it is determined that the first position parameter is a first-type numerical value (in this embodiment, it is assumed that the first-type numerical value is 0), and the first-type numerical value indicates that the sub-image block obtained by partitioning the image block is a rectangle; a second position parameter is determined according to the partition manner of the image block and the intersection information of a rectangle boundary and a boundary of an image block; and the rectangle boundary is not on the boundary of the image block. As shown in FIG. 3A, the point b is the intersection of the rectangle boundary and the boundary of the image block. As shown in FIG. 3B, the point b1 is the intersection of the rectangle boundary and the boundary of the image block.

If the horizontal partition manner is selected, the encoding sequence of the first position parameter and the second position parameter is that the first position parameter precedes the second position parameter, which, in the embodiment, may be indicated as (0, pos). If the vertical partition manner is selected, the encoding sequence of the first position parameter and the second position parameter is that the second position parameter precedes the first position parameter, which, in the embodiment, may be indicated as (pos, 0).

As shown in FIG. 3A, when horizontal partition of the image block to be encoded is performed, it is determined that the encoding sequence is (0, pos), which indicates that 0 is encoded prior to pos, in which pos indicates the difference obtained the first threshold the vertical coordinate of the first pixel point from the first threshold; pos is specifically the difference obtained by subtracting the vertical coordinate of the first pixel point from the first threshold. In FIG. 3A, the point a is the first pixel point and the vertical coordinate of the point b is the first threshold. As shown in FIG. 3B, when vertical partition is performed on the image block to be encoded, it is determined that the encoding sequence is (pos, 0), which indicates pos is encoded before 0 is encoded, in which pos indicates the difference obtained by subtracting the horizontal coordinate of the second pixel point from the second threshold; pos is specifically the difference obtained by subtracting the horizontal coordinate of the second pixel point from the second threshold, the point a1 in FIG. 3B is the second pixel point and the horizontal coordinate of the point b1 is the second threshold.

The step size of value may be fixed, or may also be adjustable, which may be adjusted according to the resolution or content of a current image. For example, for a 16*16 image block, if the difference obtained by subtracting the vertical coordinate of the first pixel point from the first threshold is 4, when the step size of value is 1, the value of pos is 4, and when the step size of value is 2, the value of pos is 2.

Certainly, it may also be determined that the second position parameter precedes the first position parameter when the horizontal partition manner is selected, or that the first position parameter precedes the second position parameter when the vertical partition manner is selected, which does not impact the implementation of the present invention.

Step 203: The encoder searches the reference image for a prediction block, where the prediction block is an image block that most matches with the irregular sub-image block obtained by performing partition.

Step 204: The encoder, according to the irregular sub-image block obtained by performing partition and the corresponding prediction block, acquires a residual and motion vector information.

The residual is an error of pixel values of corresponding pixel points of the irregular sub-image block obtained by performing partition and the prediction block; and the motion vector information indicates a position difference of the irregular sub-image block and the prediction block.

Step 205: The encoder performs transform and quantization on the residual, and performs entropy encoding on the value and data header that are obtained after the transform and quantization are performed on the residual to obtain a bitstream.

The data header includes: motion vector information, a first position parameter and a second position parameter, a sequence header, an image group header, an image header, a slice group header, a macro block header, and the like.

During the entropy encoding of the first position parameter and the second position parameter, the encoding is performed based on the encoding sequence of the two position parameters obtained in step 202.

In the embodiment, as the specific value of pos depends on the step size of value, for a high-resolution image or some images of special contents, very fine partition might be unnecessary, so that the step size of value may be carried in the sequence header, the image group header, the image header, the slice group header, and the macro block header.

In the step, encoding may be performed on pos by selecting the Golomb code of order 0 in variable length encoding, so the correspondence between a code word and the value of pos is as follows:

| code word | pos |
|---|---|
| 0 | 0 |
| 010 | 1 |
| 011 | −1 |
| 00100 | 2 |
| 00101 | −2 |
| 00110 | 3 |
| 00111 | −3 |

The encoding of pos may select the Exp-Golomb of order 0 for encoding, and may also select any other entropy encoding technologies for encoding.

Step 206: The decoder acquires the bitstream, parses the bitstream to obtain a first position parameter, a second position parameter, motion vector information, and a residual.

Step 207: During decoding, when the first numerical value obtained by the decoding is a preset first-type numerical value (the implementation of the present invention), the first numerical value is a first position parameter, so the decoded second position parameter indicates the difference obtained by subtracting the vertical coordinate of the first pixel point from the first threshold; the determined sub-image block obtained by partitioning an image block includes: a sub-image block with each pixel point whose vertical coordinate is smaller than or equal to a first threshold and a sub-image block with each pixel point whose vertical coordinate is greater than or equal to the first threshold; when the second position parameter is decoded prior to the first position parameter and the first position parameter is 0, the second position parameter indicates the difference obtained by subtracting the horizontal coordinate of the second pixel point from the second threshold, and the determined sub-image block obtained by partitioning an image block includes: one sub-image block with each pixel point whose horizontal coordinate is smaller than or equal to a second threshold and one sub-image block with each pixel point whose horizontal coordinate is greater than or equal to the second threshold.

Specifically, when the decoding sequence is (0, pos), the decoder may multiply pos with the step size of value and then add the product and the vertical coordinate of the first pixel point to obtain a first threshold. When the decoding sequence is (pos, 0), the decoder multiplies pos with the step size of value and then add the product and the horizontal coordinate of the second pixel point to obtain a second threshold.

Step 208: The decoder acquires a prediction block from the reference image according to the determination result and the motion vector information of the sub-image block in step 203.

Step 209: The decoder acquires the pixel value of each pixel in the sub-image block according to the residual and the prediction block.

An embodiment of the present invention selects at least two position parameters to identify a sub-image block obtained by partitioning an image block, in which the first position parameter identifies whether the sub-image block is a rectangle or not a rectangle, the second position parameter identifies endpoint information of the sub-image block; as the first position parameter only identifies whether the sub-image block is a rectangle or not a rectangle, the first position parameter may select one bit, so that the bit count needed for a parameter for identifying a sub-image block obtained by partitioning an image block is reduced.

Referring to FIG. 4A, another embodiment of the present invention provides an image encoding method, and the method includes:

401A: For a sub-image block obtained by partitioning an image block, determine at least two position parameters, where the at least two position parameters include a first position parameter and a second position parameter, the absolute value of the first position parameter and the absolute value of the second position parameter each identify the distance from an endpoint of a boundary of the sub-image block to a corresponding reference endpoint, the boundary of the sub-image block is not on a boundary of the image block, the corresponding reference endpoint is an endpoint on the image block that is located on a same boundary as the endpoint of the boundary of the sub-image block, and the sign of the first position parameter and the sign of the second position parameter jointly identify the position of the sub-image block in the image block.

Specifically, according to the endpoint information of the boundary of the sub-image block, the partition manner of the image block, and two reference endpoints, determine the position of the sub-image block in the image block, the absolute value of the first position parameter, and the absolute value of the second position parameter. When the sub-image block at the upper left corner or the sub-image block at the lower right corner in the image block is a triangle, two reference endpoints include: a first endpoint and a second endpoint, in which the first endpoint is the intersection between the upper boundary and the right boundary of the image block, and the second endpoint is the intersection between the lower boundary and the left boundary of the image block. When the sub-image block at the upper right corner or the sub-image block at the lower left corner in the image block is a triangle, the two reference endpoints include: a third endpoint and a fourth endpoint, in which the third endpoint is the intersection between the upper boundary and the left boundary of the image block, and the fourth endpoint is the intersection between the lower boundary and the right boundary of the image block. According to the position of the sub-image block in the image block, the sign of the first position parameter and the sign of the second position parameter are determined.

When the first position parameter and the second position parameter are both specific numerical values, the at least two position parameters further include: a third position parameter. The step further includes: determining the third position parameter. The specific numerical value may be 0 according to whether the partition manner of the image block is a partition manner from lower left to upper right or a partition manner from lower right to upper left.

402A: Encode the at least two position parameters.

Specifically, search a preset first-type code word mapping table for their respective code words of the position parameters, where in the first-type code word mapping table a probability that a position parameter to which a code 1 greater than a code 2 corresponds occurs is smaller than a probability that a position parameter to which the code word 2 corresponds occurs; or, search a preset second-type code word mapping table for one code word corresponding to the first position parameter and the second position parameter.

The embodiment of the present invention selects at least two position parameters to identify a sub-image block obtained by partitioning an image block, in which the absolute values of the two position parameters identify the distance from an endpoint of a boundary of the sub-image block to a corresponding reference endpoint, the boundary of the sub-image block is not on a boundary of the image block, the signs of the two position parameters jointly identify the position of the sub-image block in the image block, and by using the two position parameters, instead of being limited to an angle like 45 degrees, any partition type may be identified when a partition manner from lower right to upper left or from lower left to upper right is selected.

Referring to FIG. 4B, another embodiment of the present invention provides an image encoding method, and the method includes:

401B: Acquire a bitstream, and decode at least two position parameters from the bitstream, where the at least two position parameters include a first position parameter and a second position parameter, the absolute value of the first position parameter and the absolute value of the second position parameter each identify the distance from an endpoint of a boundary of the sub-image block to a corresponding reference endpoint, the boundary of the sub-image block is not on a boundary of the image block, the corresponding reference endpoint is an endpoint on the image block that is located on a same boundary as the endpoint of the boundary of the sub-image block, and the sign of the first position parameter and the sign of the second position parameter jointly identify the position of the sub-image block in the image block.

In the bitstream, the code words corresponding to the first position parameter and the second position parameter are the code words in the second-type mapping table; or, the code word corresponding to the first position parameter and code word corresponding to the second position parameter in the bitstream are code words in the first-type code word mapping table, where in the first-type code word mapping table the probability that the position parameter corresponding to the code word 1 larger than the code word 2 occurs is smaller than the probability that the position parameter corresponding to the code word 2 occurs, and the first-type mapping table and the second-type mapping table are described in detail in the following.

402B: Determine, according to the at least two position parameters, a sub-image block obtained by partitioning an image block.

The information of the sub-image block includes information such as the partition manner of an image block, the position of a sub-image block in an image block, and which pixel points are included in the sub-image block.

Specifically, when neither the absolute value of the first position parameter nor the absolute value of the second position parameter is a specific numerical value, it is determined that one sub-image block obtained by partitioning the image block is a triangle and another sub-image block is a pentagon; the position of the triangle in the image block is determined according to the sign of the first position parameter and the sign of the second position parameter; according to the absolute value of the first position parameter, the absolute value of the second position parameter, and the position of the triangle in the image block, the endpoint information of the triangle boundary is determined. When the absolute value of the first position parameter and the absolute value of the second position parameter are both specific numerical values, the at least two position parameters further include a third position parameter. In the step, according to the first position parameter and the second position parameter, it is determined the sub-image blocks obtained by partitioning the image block are two triangles; and according to the third position parameter, it is determined whether the partition manner at 45 degrees from upper right to lower left or the partition manner at 45 degrees from upper left to lower right is selected for the image block. The specific numerical value may be 0.

The embodiment of the present invention selects at least two position parameters to identify a sub-image block obtained by partitioning an image block, in which the absolute values of the two position parameters identify the distance from an endpoint of a boundary of the sub-image block to a corresponding reference endpoint, the boundary of the sub-image block is not on a boundary of the image block, the signs of the two position parameters jointly identify the position of the sub-image block in the image block, and by using the two position parameters, instead of being limited to an angle like 45 degrees, any partition type may be identified when a partition manner from lower right to upper left or from lower left to upper right is selected.

Figure 6:
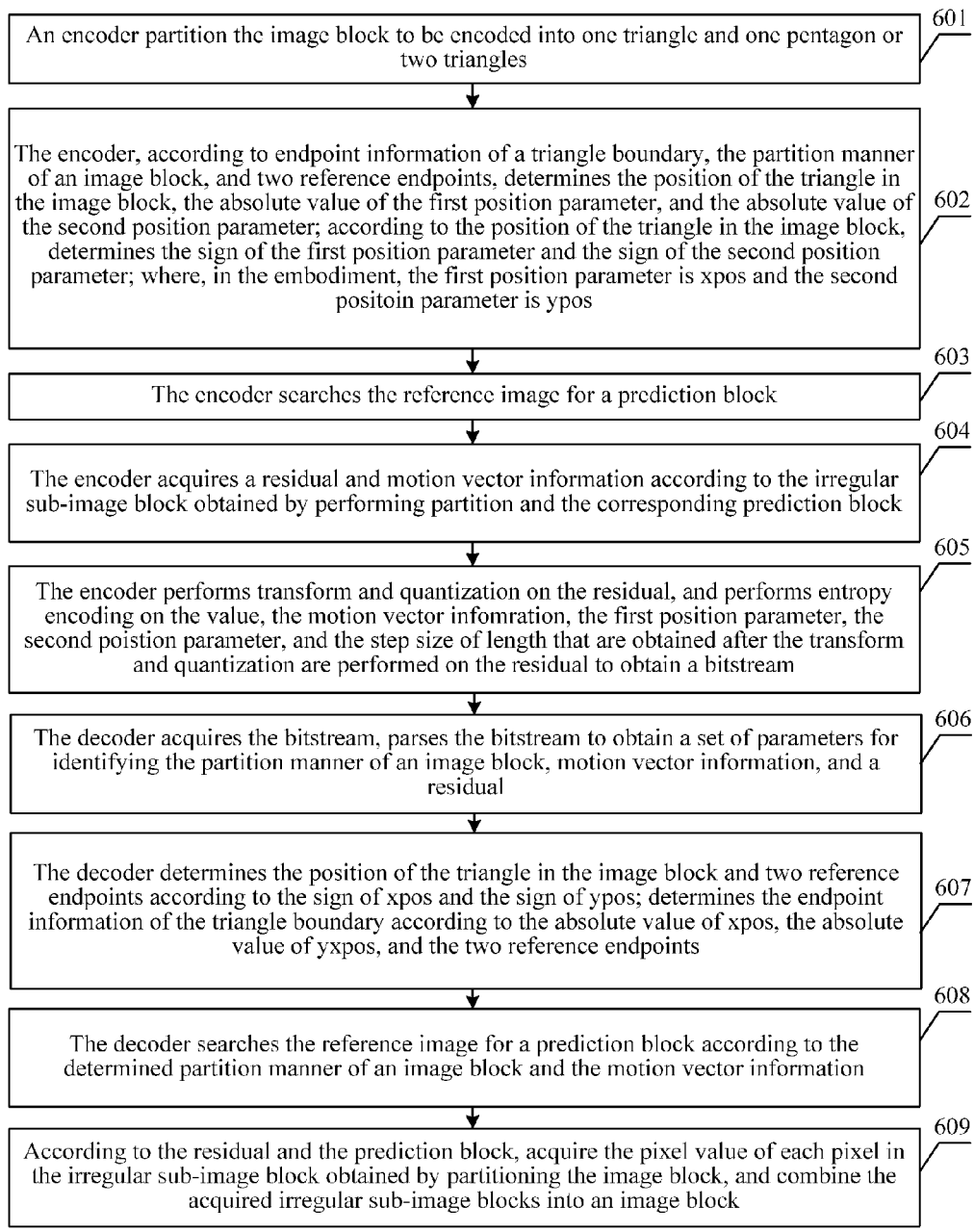
FIG. 6 is a flow chart of an image encoding and decoding method based on a partition manner from upper right to lower left or a partition manner from upper left to lower right provided in an embodiment of the present invention.

Referring to FIG. 6, another embodiment of the present invention provides an image encoding and image decoding method, in the embodiment, an image block to be encoded is partitioned into one triangle and one irregular sub-image block, the sub-image block may be a triangle or a pentagon, and the method specifically includes:

Step 601: An encoder partitions the image block to be encoded into one triangle and one irregular sub-image block according to the texture of an image, the boundary of an object, and the background boundary of an image, where the sub-image block may be a triangle or a pentagon.

Step 602: The encoder, according to endpoint information of a triangle boundary, the partition manner of an image block, and two reference endpoints, determines the position of the triangle in the image block, the absolute value of the first position parameter, and the absolute value of the second position parameter; when the sub-image block at the upper left corner or sub-image block at the lower right corner in the image block is a triangle, the two reference endpoints include: a first endpoint and a second endpoint, in which the first endpoint is the intersection between the upper boundary and the right boundary of the image block, and the second endpoint is the intersection between the lower boundary and the left boundary of the image block; when the sub-image block at the upper right corner or the sub-image block at the lower left corner in the image block is a triangle, the two reference endpoints include: a third endpoint and a fourth endpoint, in which the third endpoint is the intersection between the upper boundary and the left boundary of the image block, and the fourth endpoint is the intersection between the lower boundary and the right boundary of the image block; the sign of the first position parameter and the sign of the second position parameter are determined according to the position of the triangle in the image block; when both the first position parameter and the second position parameter are 0, the third position parameter is determined according to whether the partition manner of the image block is a partition manner from lower left to upper right or a partition manner from lower right to upper left, in which the third position parameter identifies whether the partition manner from lower left to upper right or the partition manner from lower right to upper left is selected to partition the image block into two triangles.

In the embodiment, it is assumed that the first position parameter is xpos and the second position parameter is ypos. When the values of ypos and xpos are both 0, according to the principle, the image block is partitioned into two triangles of the same size. As an image block is capable of being partitioned into two triangles of the same size in a manner from lower left to upper right or a manner from lower right to upper left, here a parameter further needs to be encoded additionally, which is used for identifying which partition manner is selected to partition the image block into triangles, so a third position parameter is provided.

Figure 5A:
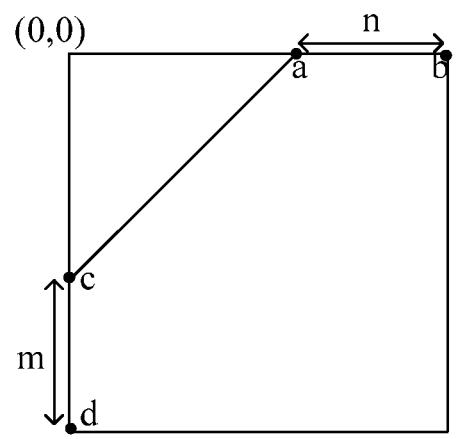
FIG. 5A is a schematic view of partition in a partition manner at 45 degrees from upper right to lower left provided in an embodiment of the present invention.
Figure 5B:
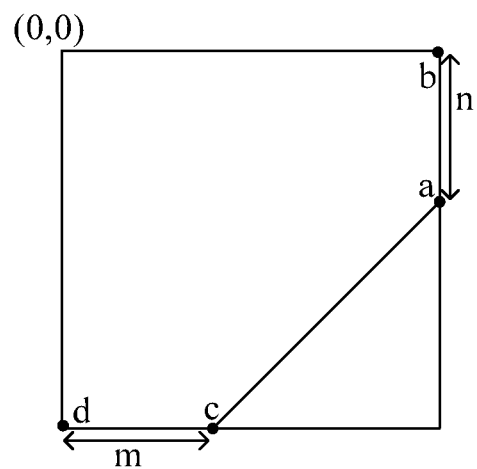
FIG. 5B is another schematic view of partition in a partition manner at 45 degrees from upper right to lower left provided in an embodiment of the present invention.
Figure 5C:
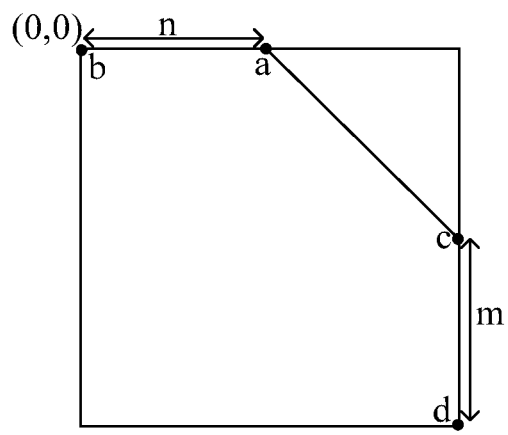
FIG. 5C is a schematic view of partition in a partition manner at 45 degrees from upper left to lower right provided in an embodiment of the present invention.
Figure 5D:
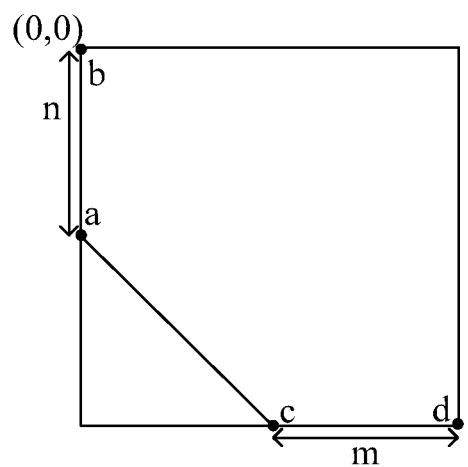
FIG. 5D is a schematic view of partition in a partition manner at 45 degrees from upper left to lower right provided in an embodiment of the present invention.

The selected irregular partition manner includes: (1) the partition from lower left to upper right, in which the sub-image block located at the upper left corner in the image block is a triangle, the partition method is shown in FIG. 5A; (2) partition from lower left to upper right, in which the sub-image block located at the lower right corner in the image block is a triangle, and the partition method is shown in FIG. 5B; (3) partition from lower right to upper left, in which the sub-image block located at the upper right corner in the image block is a triangle, and the partition method is shown in FIG. 5C; and (4) partition from lower right to upper left, in which the sub-image block located at the lower left corner in the image block is a triangle, and the partition method is shown in FIG. 5D. When the partition manners (1) and (2) are selected, the two reference endpoints include: a first endpoint and a second endpoint, in which the first endpoint is the intersection between the upper boundary and the right boundary of the image block to be encoded, as the point b shown in FIGS. 5A and 5B, the second endpoint is the intersection between the lower boundary and left boundary of the image block to be encoded, as the point d shown in FIGS. 5A and 5B. When the partition manners (3) and (4) are selected, two reference endpoints include: a third endpoint and a fourth endpoint, in which the third endpoint is the intersection between the upper boundary and the left boundary of the image block to be encoded, as the point b shown in FIGS. 5C and 5D, and the fourth endpoint is the intersection between the lower boundary and the right boundary of the image block to be encoded, as the point d shown in FIGS. 5C and 5D.

Specifically, as shown in FIG. 5A, when the partition manner (1) is selected, the two position parameters are (xpos, ypos), in which xpos=−m, ypos=−n, n indicates the distance from the intersection a between the triangle boundary (the triangle boundary is a hypotenuse that is not on the boundary of the image block) and the upper boundary of the image block to the first endpoint b; and m indicates the distance from the intersection c between the triangle boundary (the triangle boundary is a hypotenuse not on the boundary of the image block) and the left boundary of the image block to the second endpoint d. As shown in FIG. 5B, when the partition manner (2) is selected, two position parameters are (xpos, ypos), in which xpos=m, ypos=n, m indicates the distance from the intersection c between the triangle boundary (the triangle boundary is a hypotenuse not on the boundary of the image block) and the lower boundary of the image block to the second endpoint d; and n indicates the distance from the intersection a between the triangle boundary (the triangle boundary is a hypotenuse not on the boundary of the image block) and the right boundary of the image block to the first endpoint b. As shown in FIG. 5C, when the partition manner (3) is selected, two position parameters are (xpos, ypos), in which xpos=−m, ypos=n, n indicates the distance from the intersection a between the triangle boundary (the triangle boundary is a hypotenuse not on the boundary of the image block) and the upper boundary of the image block to the third endpoint b; and m indicates the distance from the intersection c between the triangle boundary (the triangle boundary is a hypotenuse not on the boundary of the image block) and the right boundary of the image block to the fourth endpoint d. As shown in FIG. 5D, when the partition manner (4) is selected, it is determined that the parameters for identifying the partition manner of the image block are (xpos, ypos), in which xpos=m, ypos=−n, m indicates the distance from the intersection c between the triangle boundary (the triangle boundary is a hypotenuse not on the boundary of the image block) and the lower boundary of the image block to the fourth endpoint d; and n indicates distance from the intersection a between the triangle boundary (the triangle boundary is a hypotenuse not on the boundary of the image block) and the left boundary of the image block to the third endpoint b.

Specifically, the values of m and n may use pixel as a unit and may also be the quotient obtained through partition of the corresponding distance and the step size of value, where the step size of value may be fixed or may also be adjustable, which may be adjusted according to the resolution or content of a current image and may also be a preset value.

Step 603: The encoder searches the reference image for a prediction block, where the prediction block is an image block that most matches with the irregular sub-image block obtained by performing partition.

Step 604: The encoder acquires a residual and motion vector information according to the irregular sub-image block obtained by performing partition and the corresponding prediction block.

The residual is an error of pixel values of corresponding pixel points of the irregular sub-image block obtained by performing partition and the prediction block, and the motion vector information indicates a position difference of the irregular sub-image block and the prediction block.

Step 605: The encoder performs transform and quantization on the residual, and performs entropy encoding on the value and data header that are obtained after the transform and quantization are performed on the residual to obtain a bitstream.

The data header includes: motion vector information, set of parameters for identifying partition manners, a sequence header, an image group header, an image header, a slice group header, a macro block header, and the like.

In the embodiment, as the specific values of xpos and ypos depend on the step size of value, for a high-resolution image or some images of special contents, very fine partition might be unnecessary, so that the step size of value may be carried in the sequence header, the image group header, the image header, the slice group header, and the macro block header, and the step size of value may indicate the values of xpos and ypos in a code word mapping table.

It is found through the statistics of multiple partition manners of image blocks E, xpos and ypos conform to a certain rule. According to the rule obtained through statistics, different code words are allocated to the values of xpos and ypos. To reduce the bit count of position parameters (xpos and ypos) for identification, the step size of value for xpos and ypos is 2, the mappings between the values of xpos and ypos and code words are shown in Table 1 and Table 2 (Table 1 and Table 2 are referred to as a first-type code word mapping table). The code words in the tables reflect statistical probabilities of different values of xpos and ypos. The probability that xpos or ypos corresponding to a code word 1 larger than a code word 2 occurs is smaller than the probability that xpos or ypos corresponding to the code word 2, namely, the probability that xpos or ypos corresponding to a large code word occurs is smaller than or equal to the probability that xpos or ypos corresponding to a small code word occurs. Therefore, xpos or ypos with a high probability of occurrence is indicated by a small code word, so as to further enhancing the encoding efficiency.

TABLE 1

| Value of xpos | 0  | 2  | 4  | 6  | 8   | 10  | 12  | 14  |
|---|---|---|---|---|---|---|---|---|
| Code word     | 0  | 12 | 8  | 4  | 5   | 10  | 13  | 2   |
| Value of xpos | -2 | -4 | -6 | -8 | -10 | -12 | -14 | -16 |
| Code word     | 3  | 14 | 11 | 6  | 7   | 9   | 15  | 1   |

TABLE 2

| Value of ypos | 2  | 4  | 6  | 8  | 10  | 12  | 14  | 16  |
|---|---|---|---|---|---|---|---|---|
| Code word     | 0  | 12 | 8  | 4  | 5   | 10  | 13  | 2   |
| Value of ypos | 0  | -2 | -4 | -6 | -8  | -10 | -12 | -14 |
| Code word     | 3  | 14 | 11 | 6  | 7   | 9   | 15  | 1   |

In the step, the encoder finds a corresponding code word in Table 1 according to the value of xpos, finds a corresponding code word in Table 2 according to the value of ypos, and a conventional variable length encoding method such as huffman coding, exponential-Golomb coding, and unary coding is used to encode the corresponding code word, thereby achieving the object of saving the encoding efficiency.

Alternatively, form xpos and ypos into one two-dimensional data pair (xpos, ypos), design a code table, and map (xpos, ypos) to one code word. For a 16×16 block E, when the step size of value is 4, the mapping table for two-dimensional mapping thereof is shown in Table 3. Table 3 is referred to as a second-type code word mapping table.

TABLE 3

| | n | | | | | | | | |
|---|---|---|---|---|---|---|---|---|---|
| m | 16 | 12 | 8 | 4 | 0 | -4 | -8 | -12 | -16 |
| 16 | — | — | — | — | 0  | 31 | 32 | 28 | — |
| 12 | — | — | 52 | 56 | 35 | 6  | 39 | 22 | 45 |
| 8  | — | 55 | 25 | 58 | 11 | 17 | 2  | 18 | 14 |
| 4  | — | 48 | 51 | 23 | 33 | 38 | 43 | 4  | 16 |
| 0  | — | 47 | 9  | 34 | 8  | 27 | 10 | 44 | — |

TABLE 3-continued

| | n | | | | | | | | |
|---|---|---|---|---|---|---|---|---|---|
| m | 16 | 12 | 8 | 4 | 0 | -4 | -8 | -12 | -16 |
| -4  | 15 | 5  | 41 | 42 | 37 | 24 | 50 | 49 | — |
| -8  | 13 | 19 | 1  | 20 | 12 | 57 | 26 | 54 | — |
| -12 | 46 | 21 | 40 | 3  | 36 | 59 | 53 | —  | — |
| -16 | 7  | 29 | 31 | 30 | —  | —  | —  | —  | — |

In the step, the encoder finds a corresponding code word in Table 3 according to the values of xpos and ypos, and a conventional variable length encoding method such as huffman coding, exponential-Golomb coding, and unary coding is used to encode the corresponding code word, thereby achieving the object of saving the encoding efficiency.

Step 606: The decoder acquires the bitstream, parses the bitstream to obtain a set of parameters for identifying the partition manner of an image block, motion vector information, and a residual.

Step 607: When neither the absolute value of the first position parameter nor the absolute value of the second position parameter is 0, determine that one sub-image block obtained by partitioning the image block is a triangle and another sub-image block is a pentagon; determine the position of the triangle in the image block according to the sign of the first position parameter and the sign of the second position parameter; according to the absolute value of the first position parameter, the absolute value of the second position parameter, and the position of the triangle in the image block, determine endpoint information of the triangle boundary to further obtain two sub-image blocks; when both the absolute value of the first position parameter and the absolute value of the second position parameter are 0, determine that the sub-image blocks obtained by partitioning the image block are two triangles; and according to the third position parameter, determine whether the partition manner at 45 degrees from upper right to lower left or the partition manner at 45 degrees from upper left to lower right is selected for the image block to obtain two sub-image blocks.

Specifically, if xpos is not equal to 0 and ypos is not equal to 0, the decoder learns that the image block is partitioned into one triangle and one pentagon; according to the sign of xpos and the sign of ypos, determines the position of the triangle in the image block and two reference endpoints; according to the absolute value of xpos, the absolute value of ypos, and the two reference endpoints, determines endpoint information of the two acute-angle positions of the triangle, namely, the horizontal and vertical coordinates of the point a and the point c in FIGS. 5A, 5B, 5C, and 5D.

The process of determining the image block partition manner and two reference endpoints according to the sign of xpos and the sign of ypos may include: when xpos<0 and ypos<0, the sub-image block at the upper left corner in the image block is a triangle, and two reference endpoints include a first endpoint and a second endpoint; when xpos>0 and ypos>0, the sub-image block at the lower right corner in the image block is a triangle, and two reference endpoints include a first endpoint and a second endpoint; when xpos<0 and ypos>0, the sub-image block at the upper right corner in the image block is a triangle, and the two reference endpoints include a third endpoint and a fourth endpoint; and when xpos>0 and ypos<0, the sub-image block at the lower left corner in the image block is a triangle, and two reference endpoints include a third endpoint and a fourth endpoint.

In addition, the process of determining the partition manner of the image block and two reference endpoints according to the sign of xpos and the sign of ypos may include: when xpos<0 and ypos>0 or xpos>0 and ypos>0 or xpos>0 and ypos<0, the sub-image block at the upper left corner in the image block is a triangle, and the two reference endpoints include a first endpoint and a second endpoint; when xpos>0 and ypos<0 or xpos<0 and ypos<0 or xpos<0 and ypos>0, the sub-image block at the lower right corner in the image block is a triangle, and the two reference endpoints include a first endpoint and a second endpoint; when xpos<0 and ypos<0 or xpos>0 and ypos>0 or xpos>0 and ypos<0, the sub-image block at the upper right corner in the image block is a triangle, and the two reference endpoints include a third endpoint and a fourth endpoint; when xpos>0 and ypos>0 or xpos<0 and ypos<0 or xpos<0 and ypos>0, the sub-image block at the lower left corner in the image block is a triangle, and the two reference endpoints include a third endpoint and a fourth endpoint.

When xpos is equal to 0 and ypos is equal to 0, the decoder may learn that the image block is partitioned into two triangles of the same size, and here then acquires from the bitstream a third position parameter used for determining whether a partition manner from lower left to upper right or a partition manner from lower right to upper left is selected for the image block.

Step 608: The decoder acquires two prediction blocks in the reference image according to the determined partition manner of an image block by the encoder and the motion vector information, where the two prediction blocks are prediction blocks corresponding to two sub-image blocks for which irregular partition is selected.

Step 609: The decoder acquires, according to the residual and the prediction block, the pixel value of each pixel in the irregular sub-image block obtained by partitioning the image block.

In the embodiment of the present invention, the image block to be encoded is partitioned into one triangle and one pentagon or two triangles, which makes it convenient to find a suitable prediction block in the reference image and achieves a very small error between the found prediction block and the sub-image block obtained by performing partition, thereby enhancing the encoding efficiency of an image block.

In consideration of the high probability of using irregular blocks obtained by performing partition at 45 degrees in practical encoding and in such a partition manner the absolute values of the xpos and ypos are equal, to save the encoding bits of the set of parameters for identifying the partition manner, the methods introduced in the following embodiments may be selected to identify that the partition manner at 45 degrees is selected for the image block.

Figure 7:
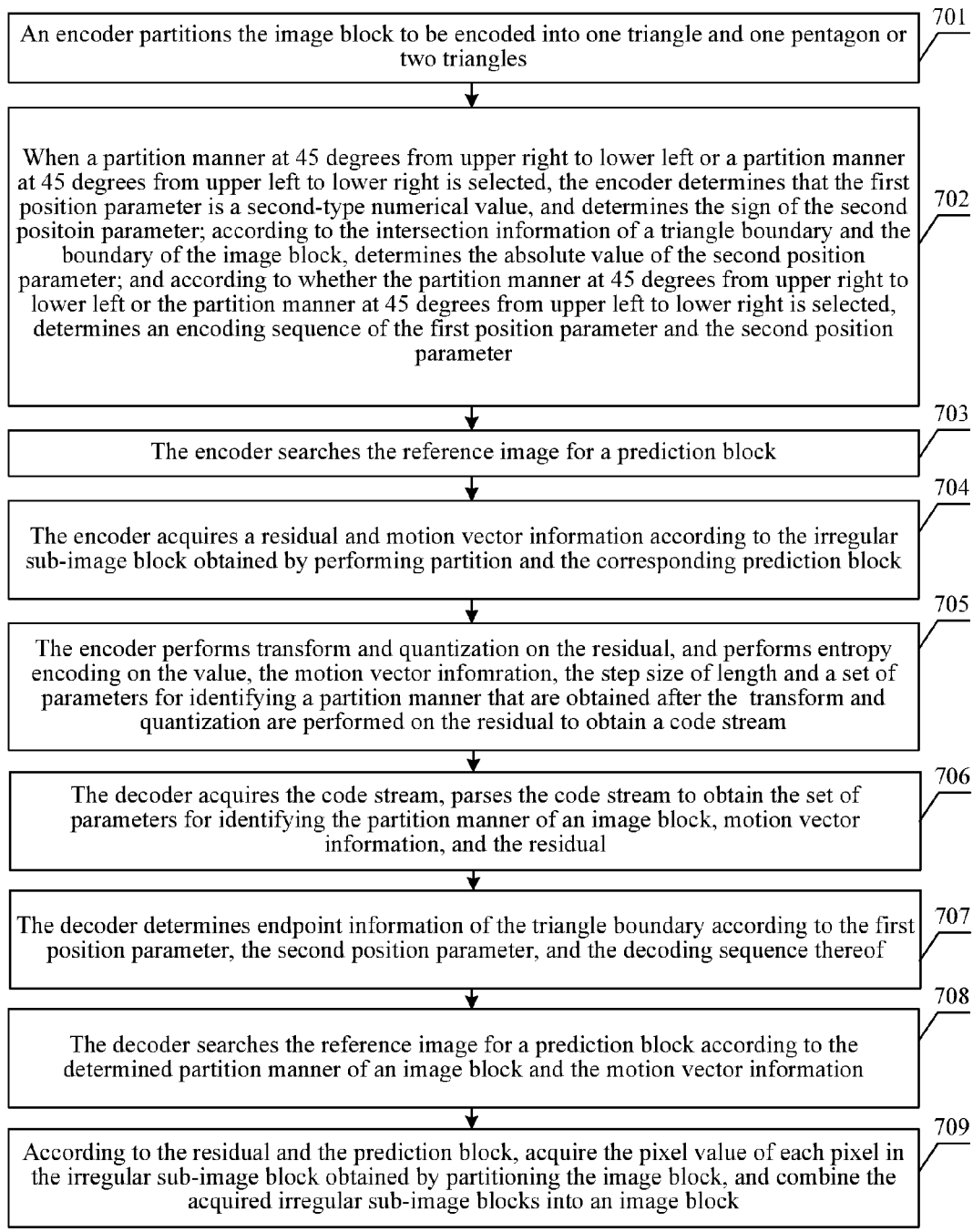
FIG. 7 is a flow chart of an image encoding and decoding method based on a partition manner from upper right to lower left or a partition manner from upper left to lower right provided in yet another embodiment of the present invention.

Referring to FIG. 7, an embodiment of the present invention provides an image encoding method, and in the embodiment, the image block to be encoded is partitioned into one triangle and one pentagon or two triangles. The difference between the method and the foregoing embodiments is that: in this embodiment, the encoder performs partition at 45 degrees, (1, pos) and (pos, 1) are used to identify four partition manners, the sign of pos indicates that the sub-image block at the upper left corner or the sub-image block at the lower right corner in the image block is a triangle during the partition based on the partition manner at 45 degrees from upper right to lower left, and whether the sub-image block at the lower left corner or the sub-image block at the upper right corner in the image block is a triangle during the partition based on the partition manner at 45 degrees from upper left to lower right, the absolute value of pos indicates the endpoint information of the triangle boundary, the triangle boundary is not on the boundary of the image block, and the sign of pos and the absolute value of pos are used for joint encoding. The method specifically includes:

Step 701: The encoder partitions the image block to be encoded into one triangle and one pentagon or two triangles according to the texture of an image, the boundary of an object, and the background boundary of an image.

Step 702: When a partition manner at 45 degrees from upper right to lower left or a partition manner at 45 degrees from upper left to lower right is selected, the encoder determines that the first position parameter is a second-type numerical value; when the partition manner at 45 degrees from upper right to lower left is selected for partition, the encoder determines the sign of the second position parameter according to which one of the sub-image block at the upper left corner and the sub-image block at the lower right corner in the image block to be encoded is a triangle; when the partition manner at 45 degrees from upper left to lower right is selected for partition, the encoder determines the sign of the second position parameter according to which one of the sub-image block at the lower left corner and the sub-image block at the upper right corner in the image block is a triangle; the encoder determines the absolute value of the second position parameter according to the intersection information of the triangle boundary (the triangle boundary is a hypotenuse not on the boundary of the image block) and the boundary of the image block; and the encoder determines an encoding sequence of the first position parameter and the second position parameter according to which one of the partition manner at 45 degrees from upper right to lower left and the partition manner at 45 degrees from upper left to lower right is selected.

In the embodiment, the first position parameter is N, and the second position parameter is pos, where N is a non-zero value, which, in this embodiment, may be assumed as 1. When the image block is partitioned into one triangle and one pentagon, the value of pos is not 0; and when the image block is partitioned into two triangles, the value of pos is 0.

Specifically, when the partition manner shown in FIG. 5A and FIG. 5B is selected for the image block (that is, the partition at 45 degrees from lower left to upper right), the encoding sequence is (1, pos), namely, 1 is encoded before pos is encoded. When the image block selects the partition manner shown in FIG. 5C and FIG. 5D (that is, partition at 45 degrees from upper left to lower right), the encoding sequence is (pos, 1), namely, pos is encoded before 1 is encoded. Specifically, the absolute value of pos may be quotient through the partition of m or n and the step size of value.

Step 703 to step 706 are the same as step 603 to step 606, which are no longer described here.

Step 707: During the decoding of the at least two position parameters, when the first numerical value obtained by the decoding is a preset second-type numerical value, the first numerical value is a first position parameter; when the first numerical value obtained by the decoding is not a first-type numerical value or a second-type numerical value and the decoded second numerical value is a preset second-type numerical value, the second numerical value is a first position parameter; according to the sequence of the two position parameters obtained during decoding, determine whether the partition manner at 45 degrees from upper right to lower left or the partition manner at 45 degrees from upper left to lower right is selected for the image block; when the first position parameter is a preset second-type numerical value, determine that one sub-image block obtained by partitioning an image block is a triangle; when the partition manner at 45 degrees from upper right to lower left is selected, according to the sign of the second position parameter, determine that the triangle is located at the upper left corner or the lower right corner in the image block; when the partition manner at 45 degrees from upper left to lower right is selected, according to the sign of the second position parameter, determine that the triangle is located at the lower left corner or the upper right corner in the image block; determine the endpoint information of the triangle boundary according to the position of the triangle in the image block and the absolute value of the second position parameter, where the triangle boundary is not on the boundary of the image block. The endpoint information of the triangle boundary is the horizontal and vertical coordinates of the point a and point c shown in FIGS. 5A, 5B, 5C, and 5D.

When the value of pos is not 0, the decoder may determine that the image block is partitioned into one triangle and one pentagon; and when the value of pos is 0, the decoder may determine that the image block is partitioned into two triangles.

For example, in this embodiment, it is assumed that the first-type numerical value is 0 and the second-type numerical value is 1; when the first numerical value obtained by the decoding is 1, the first numerical value is the first position parameter, so that the second numerical value parsed subsequently is the second position parameter; and when the first numerical value obtained by the decoding is not 1 or 0 and the decoded second numerical value is 1, the first numerical value is the second position parameter and the second numerical value is the first position parameter.

Step 708 and step 709 are the same as step 608 and step 609, which are no longer described here.

In the embodiment, (1, +|pos|), (+|pos|, 1), (1, −|pos|), and (−|pos|, 1) are selected to identify a sub-image block obtained by partitioning an image block, so that the bit count needed for a parameter for identifying a sub-image block obtained by partitioning an image block is reduced.

In addition, in this embodiment, as (pos, 1) and (1, pos) are used for identifying an irregular partition manner of partition at 45 degrees, and different from the method in the foregoing the embodiment, (0, 1) and (1, 0) no longer indicate that the image block is partitioned into two rectangles of different sizes, and instead are used for indicating that the image block is partitioned into two triangles.

Figure 8:
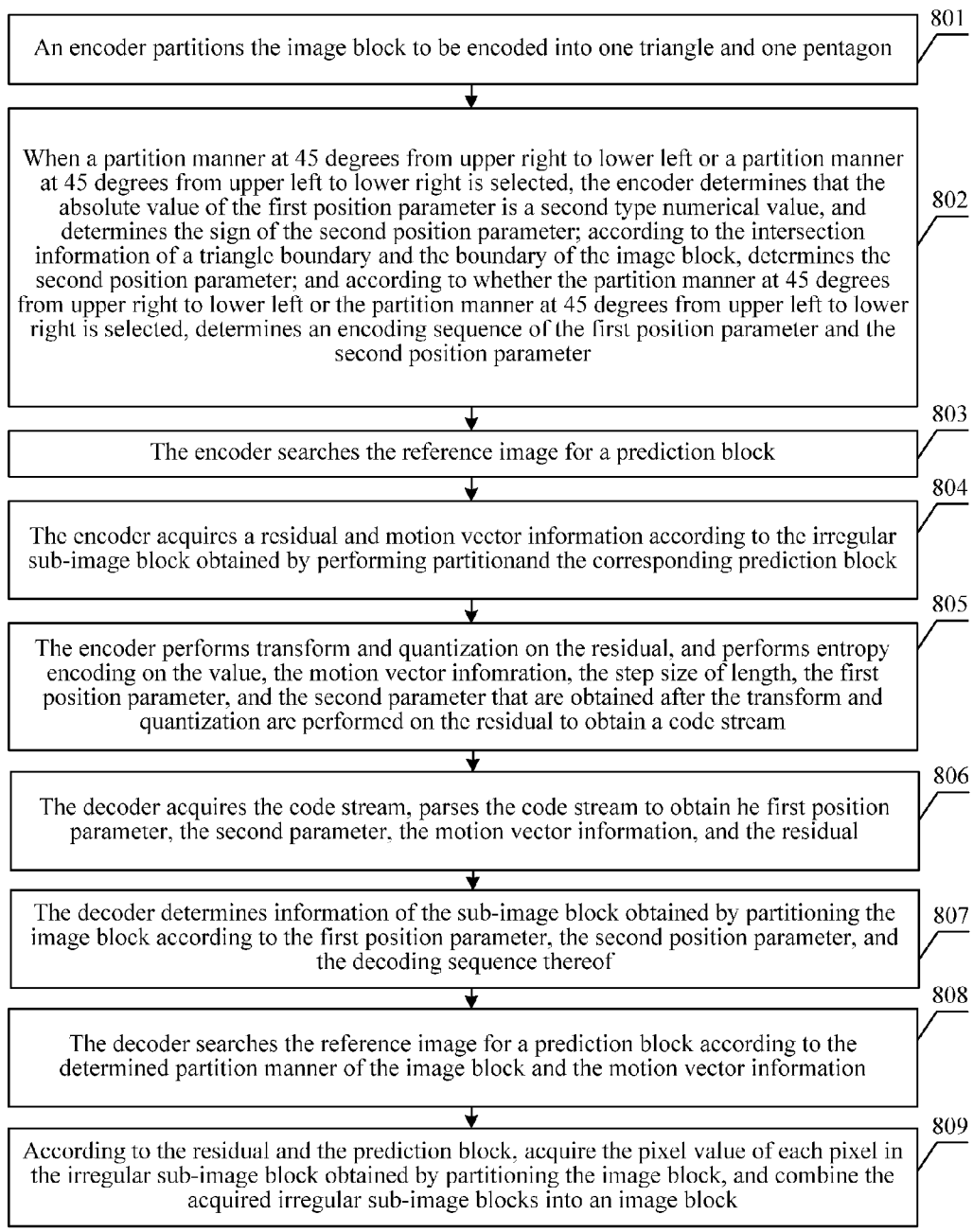
FIG. 8 is a flow chart of an image encoding and decoding method based on a partition manner from upper right to lower left or a partition manner from upper left to lower right provided in another embodiment of the present invention.

Referring to FIG. 8, another embodiment of the present invention provides an image encoding and decoding method, in the embodiment, the image block to be encoded is partitioned into one triangle and one pentagon or two triangles, and the difference between the method and the embodiment is that: (1, pos), (−1, pos), (pos, 1), and (pos, −1) are used for identifying four partition manners, respectively. The method specifically includes:

Step 801: An encoder partitions the image block to be encoded into one triangle and one pentagon or two triangles according to the texture of an image, the boundary of an object, and the background boundary of an image.

Step 802: When a partition manner at 45 degrees from upper right to lower left or a partition manner at 45 degrees from upper left to lower right is selected, the encoder determines that the absolute value of the first position parameter is a second-type numerical value, when a partition manner at 45 degrees from upper right to lower left is selected for partition, according to which one of the sub-image block at the upper left corner and the sub-image block at the lower right corner is a triangle, determines the sign of the first position parameter; when the partition manner at 45 degrees from upper left to lower right is selected for partition, determines the sign of the first position parameter according to which one of the sub-image block at the lower left corner and the sub-image block at the upper right corner in the image block is a triangle; according to the intersection information of a triangle boundary (the triangle boundary is a hypotenuse not on the boundary of the image block) and the boundary of the image block, determines a second position parameter; and determines an encoding sequence of the first position parameter and the second position parameter according to which one of the partition manner at 45 degrees from upper right to lower left and the partition manner at 45 degrees from upper left to lower right is selected.

In the embodiment, the first position parameter is N, the second position parameter is pos, where N is a non-zero value, which, in this embodiment, may be assumed as 1. When the image block is partitioned into one triangle and one pentagon, the value of pos is not 0; and when the image block is partitioned into two triangles, the value of pos is 0.

For example, when the partition manner (partition at 45 degrees from lower left to upper right) shown in FIG. 5A is selected for the image block, the encoding sequence is (1, pos), namely, 1 is encoded prior to pos; when the partition manner (partition at 45 degrees from lower left to upper right) shown in FIG. 5B is selected for the image block, the encoding sequence is (−1, pos), namely, −1 is encoded before pos is encoded; when the partition manner (partition at 45 degrees from upper left to lower right) shown in FIG. 5C is selected for the image block, the encoding sequence is (pos, 1), namely, pos is encoded before 1 is encoded; when the partition manner (that is, partition at 45 degrees from upper left to lower right) shown in FIG. 5D is selected for the image block, the encoding sequence is (pos, −1), namely, pos is encoded before −1 is encoded.

Specifically, in the step, xpos and ypos may also be acquired first based on the manner in step 602 in the foregoing embodiment. When the partition manner (that is, partition at 45 degrees from lower left to upper right) shown in FIG. 5A and FIG. 5B is selected for the image block, if the value of ypos is smaller than 0, the value of xpos is set to 1, so the encoding sequence in FIG. 5A is (1, pos), and pos is the absolute value of xpos or ypos; if the value of ypos is greater than 0, the value of xpos is set to −1, so the encoding sequence in FIG. 5B is (−1, pos), and pos is the absolute value of xpos or ypos. When the partition manner (that is, the partition at 45 degrees from lower left to upper right) shown in FIG. 5C and FIG. 5D is selected for the image block, if the value of xpos is smaller than 0, the value of ypos is 1, so the encoding sequence in FIG. 5C is (pos, 1), and pos is the absolute value of the xpos or ypos; if the value of xpos is greater than 0, the value of ypos is set to −1, and the encoding sequence in FIG. 5D is (pos, −1).

Step 803 to step 806 are the same as step 703 to step 706, which are no longer described here.

Step 807: During the decoding of the at least two position parameters, when the absolute value of the first numerical value obtained by the decoding is a preset second-type numerical value, the first numerical value is a first position parameter; when the absolute value of the first numerical value obtained by the decoding is not the first-type numerical value or the second-type numerical value, and the absolute value of the decoded second numerical value is a preset second-type numerical value, the second numerical value is a first position parameter; according to the sequence of the two position parameters obtained during the decoding, determine whether the partition manner at 45 degrees from upper right to lower left or the partition manner at 45 degrees from upper left to lower right is selected for the image block; when the absolute value of the first position parameter is a preset second-type numerical value, determine that one sub-image block obtained by partitioning an image block is a triangle; when the partition manner at 45 degrees from upper right to lower left is selected, determine that the triangle is located at the upper left corner or the lower right corner in the image block according to the sign of the first position parameter; when the partition manner at 45 degrees from upper left to lower right is selected, determine that the triangle is located at the lower left corner or the upper right corner in the image block according to the sign of the first position parameter; determine the endpoint information of the triangle boundary according to the position of the triangle in the image block and the second position parameter, where the triangle boundary is not on the boundary of the image block. The endpoint information of the triangle boundary is the horizontal and vertical coordinates of the point a and point c shown in FIGS. 5A, 5B, 5C, and 5D.

When the value of pos is not 0, the decoder may determine that the image block is partitioned into one triangle and one pentagon; and when the value of pos is 0, the decoder may determine that the image block is partitioned into two triangles.

For example, in this embodiment, it is assumed that the first-type numerical value is 0 and the second-type numerical value is 1, when the absolute value of the first numerical value obtained by the decoding is 1, the first numerical value is a first position parameter, so that the second numerical value parsed subsequently is the second position parameter; when the absolute value of the first numerical value obtained by the decoding is not 1 and 0, and the absolute value of the decoded second numerical value is 1, the first numerical value is the second position parameter, and the second numerical value is the first position parameter.

Step 808 and step 809 are the same as step 708 and step 709, which are no longer described here.

In the embodiment, (1, pos), (−1, pos), (pos, 1), and (pos, −1) are selected to identify a sub-image block obtained by partitioning an image block, so that the bit count needed for a parameter for identifying a sub-image block obtained by partitioning an image block is reduced.

During the encoding of the position parameter pos, a solution in which the sign information of the position parameter pos and the absolute value of the position parameter pos are separately encoded may also be selected, and such an encoding solution is capable of enhancing the encoding efficiency in certain scenarios. For example, if pos is encoded by selecting the Golomb code of order 0 in the variable length encoding, when the sign information of the position parameter pos and the absolute value of the position parameter pos are used for joint encoding, the code word is encoded as follows:

| Code word | pos |
|---|---|
| 0 | 0 |
| 010 | 1 |
| 011 | −1 |
| 00100 | 2 |
| 00101 | −2 |
| 00110 | 3 |
| 00111 | −3 |

Therefore, when the value of pos to be encoded is 2 or −2, 5 bits are needed for the encoding. If the value of pos being 2 or −2 is used frequently during the irregular partition of the image block in the current image, the encoding efficiency is lowered. By selecting the solution in which the sign information of the position parameter pos and the absolute value of the position parameter pos are separately encoded respectively, the sign information (positive or negative) of pos is separately encoded using 1 bit, and the numerical value (absolute value) of pos is separately encoded, so that during the encoding using the Golomb code of order 0, the relationship between the code word and the numerical value of pos are encoded as follows:

| Code word | Numerical value of pos: |
|---|---|
| 0 | 0 |
| 010 | 1 |
| 011 | 2 |

At this time, when the value of pos is encoded as 2 or −2, only 1 bit is needed for encoding the sign information of pos and 3 bits are needed for encoding the absolute value of pos, so that in total 4 bits are need to complete the encoding when the value of pos is 2 or −2, and such an encoding solution is capable of achieving the object of enhancing the encoding efficiency.

To further enhance the encoding efficiency, in step 205 and step 605, the sign and absolute value of pos may be separately encoded respectively. For example, 0 in (0, pos) is encoded separately, it is assumed that the obtained code word is m1, the sign (positive or negative) of pos is encoded separately by using 1 bit, it is assumed that the obtained code word is m2, the absolute value of pos is separately encoded, it is assumed that the obtained code word is m3, the code word corresponding to (0, pos) is (m1, m2, m3), and then encoder writes m1, m2, and m3 in sequence. Correspondingly, the decoder reads m1, m2, and m3 in sequence to perform corresponding decoding to obtain (0, pos).

It should be further illustrated that during the encoding of (0, pos), the sign (positive or negative) of pos may be encoded first separately by using 1 bit, then 0 is separately encoded, and the absolute value of pos is separately encoded, or also, 0 may be separately encoded first, the absolute value of pos is separately encoded, and in the end the sign (positive or negative) of pos is encoded separately by using 1 bit, which does not impact the implementation of the present invention.

Whether to select the solution in which the sign of pos and the absolute value of pos are used for joint encoding or select the solution in which the sign of pos and the absolute value of pos are separately encoded respectively may be specified in the video encoding and decoding system in advance, or an identifier indicating which encoding solution may be carried in a sequence header, an image group header, an image header, a slice group header, a slice set header, a slice header, an image block header, a super macro block header, and a macro block header.

Figure 9:
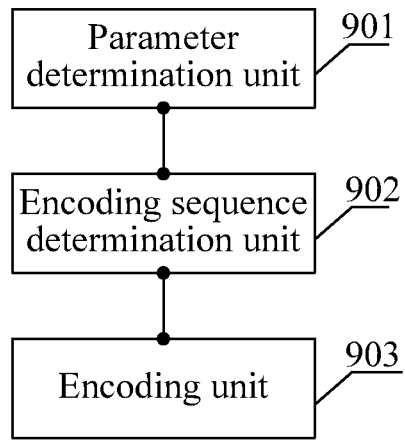
FIG. 9 is a structural view of an image encoding device provided in an embodiment of the present invention.

Referring to FIG. 9, an embodiment of the present invention provides an image encoding device, which includes: a parameter determination unit 901 configured to: for a sub-image block obtained by partitioning an image block, determine at least two position parameters, where the at least two position parameters include a first position parameter and a second position parameter, the first position parameter identifies whether the sub-image block is a rectangle or not a rectangle, and the second position parameter identifies endpoint information of the sub-image block; an encoding sequence determination unit 902 configured to determine an encoding sequence of the first position parameter and the second position parameter according to a partition manner of the image block; and an encoding unit 903 configured to encode the at least two position parameters according to the determined encoding sequence.

The parameter determination unit 901 includes: a first parameter determination subunit configured to: when the horizontal partition manner or the vertical partition manner is selected, determine that the first position parameter is a first-type numerical value, where the first-type numerical value indicates that the sub-image block obtained by partitioning the image block is a rectangle; and according to intersection information of a rectangle boundary and a boundary of an image block, determine a second position parameter, where the rectangle boundary is not on the boundary of the image block.

Correspondingly, the encoding sequence determination unit 902 includes: a first encoding sequence determination subunit configured to determine an encoding sequence of the first position parameter and the second position parameter according to which one of a horizontal partition manner and a vertical partition manner is selected.

Alternatively, the parameter determination unit 901 includes: a second parameter determination subunit configured to: when a partition manner at 45 degrees from upper right to lower left or a partition manner at 45 degrees from upper left to lower right is selected, determine that the absolute value of the first position parameter is a second-type numerical value; and a third parameter determination subunit configured to: when a partition manner at 45 degrees from upper right to lower left is selected, determine the sign of the first position parameter according to which one of the sub-image block at the upper left corner and the sub-image block at the lower right corner in the image block is a triangle; when the partition manner at 45 degrees from upper left to lower right is selected for partition, determine the sign of the first position parameter according to which one of the sub-image block at the lower left corner and the sub-image block at the upper right corner in the image block is a triangle; and a fourth parameter determination subunit configured to: according to the intersection information of the triangle boundary and the boundary of the image block, determine a second position parameter, where the triangle boundary is not on the boundary of the image block.

Alternatively, the parameter determination unit 901 includes: a fifth parameter determination subunit configured to: when a partition manner at 45 degrees from upper right to lower left or a partition manner at 45 degrees from upper left to lower right is selected, determine that the first position parameter is a second-type numerical value; a sixth parameter determination subunit configured to: when a partition manner at 45 degrees from upper right to lower left is selected, determine the sign of the second position parameter according to which one of the sub-image block at the upper left corner and the sub-image block at the lower right corner in the image block is a triangle; when a partition manner at 45 degrees from upper left to lower right is selected, determine the sign of the second position parameter according to which one of the sub-image block at the lower left corner and the sub-image block at the upper right corner in the image block is a triangle; and a fifth parameter determination subunit configured to: according to the intersection information of the triangle boundary and the boundary of the image block, determine the absolute value of the second position parameter, where the triangle boundary is not on the boundary of the image block.

Correspondingly, the encoding sequence determination unit 902 includes: a second encoding sequence determination subunit configured to determine an encoding sequence of the first position parameter and the second position parameter according to which one of the partition manner at 45 degrees from upper right to lower left and the partition manner at 45 degrees from upper left to lower right is selected.

Specifically, the encoding unit 903 is configured to: when the second position parameter is a signed parameter, according to the determined encoding sequence, encode the first position parameter separately, encode the absolute value of the second position parameter separately, and encode the sign of the second position parameter separately by using 1 bit. Alternatively, the encoding unit 903 is configured to: when the first position parameter is a signed parameter, according to the determined encoding sequence, encode the absolute value of the first position parameter separately, encode the second position parameter separately, and encode the sign of the first position parameter separately by using 1 bit.

The embodiment of the present invention selects at least two position parameters to identify a sub-image block obtained by partitioning an image block, in which the first position parameter identifies whether the sub-image block is a rectangle or not a rectangle, the second position parameter identifies endpoint information of the sub-image block; as the first position parameter only identifies whether the sub-image block is a rectangle or not a rectangle, the first position parameter may select one bit, so that the bit count needed for a parameter for identifying a sub-image block obtained by partitioning an image block is reduced.

Figure 10:
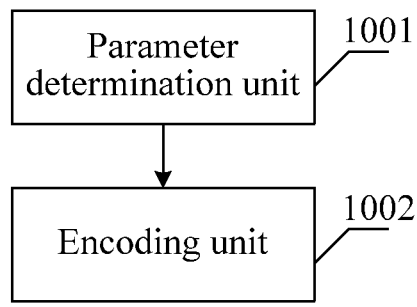
FIG. 10 is a structural view of an image encoding device provided in another embodiment of the present invention.

Referring to FIG. 10, another embodiment of the present invention provides an image encoding device, which includes: a parameter determination unit 1001 configured to: for a sub-image block obtained by partitioning an image block, determine at least two position parameters, where the at least two position parameters include a first position parameter and a second position parameter, the absolute value of the first position parameter and the absolute value of the second position parameter each identify the distance from an endpoint of a boundary of the sub-image block to a corresponding reference endpoint, the boundary of the sub-image block is not on a boundary of the image block, the corresponding reference endpoint is an endpoint on the image block that is located on a same boundary as the endpoint of the boundary of the sub-image block, and the sign of the first position parameter and the sign of the second position parameter jointly identify the position of the sub-image block in the image block; and an encoding unit 1002 configured to encode the at least two position parameters.

Specifically, the parameter determination unit 1001 includes: a parameter determination subunit 1 configured to: according to endpoint information of the boundary of the sub-image block, the partition manner of an image block, and two reference endpoints, determine the position of a sub-image block in an image block, the absolute value of the first position parameter, and the absolute value of the second position parameter; where when the sub-image block at the upper left corner or sub-image block at the lower right corner in the image block is a triangle, two reference endpoints include a first endpoint and a second endpoint, in which the first endpoint is the intersection between the upper boundary and the right boundary of the image block; the second endpoint is the intersection between the lower boundary and the left boundary of the image block; when the sub-image block at the upper right corner or the sub-image block at the lower left corner in the image block is a triangle, the two reference endpoints include: a third endpoint and a fourth endpoint, the third endpoint is the intersection between the upper boundary and the left boundary of the image block, and the fourth endpoint is the intersection between the lower boundary and the right boundary of the image block; a parameter determination subunit 2 configured to: according to the position of the sub-image block in the image block, determine the sign of the first position parameter and the sign of the second position parameter; and a parameter determination subunit 3 configured to: when both the first position parameter and the second position parameter are 0, determine a third position parameter according to whether the partition manner of the image block is a partition manner from lower left to upper right or a partition manner from lower right to upper left.

Specifically, the encoding unit 1002 is configured to search a preset first-type code word mapping table for their respective code words of the position parameters; where in the first-type code word mapping table, a probability that a position parameter to which a code 1 greater than a code 2 corresponds occurs is smaller than a probability that a position parameter to which the code word 2 corresponds occurs; or, search a preset second-type code word mapping table for one code word corresponding to the first position parameter and the second position parameter.

The embodiment of the present invention selects at least two position parameters to identify a sub-image block obtained by partitioning an image block, in which the absolute values of the two position parameters identify the distance from an endpoint of a boundary of the sub-image block to a corresponding reference endpoint, the boundary of the sub-image block is not on a boundary of the image block, the signs of the two position parameters jointly identify the position of the sub-image block in the image block, and by using the two position parameters, instead of being limited to an angle like 45 degrees, any partition type may be identified when a partition manner from lower right to upper left or from lower left to upper right is selected.

Figure 11:
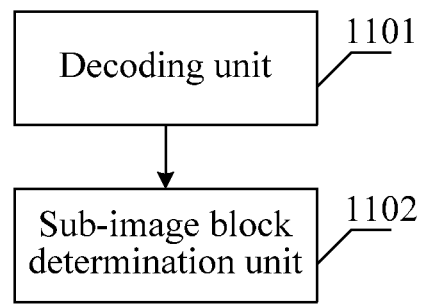
FIG. 11 is a structural view of an image decoding device provided in an embodiment of the present invention.

Referring to FIG. 11, an embodiment of the present invention provides an image decoding device, which includes: a decoding unit 1101 configured to acquire a bitstream, and decode at least two position parameters from the bitstream, where the at least two position parameters include a first position parameter and a second position parameter, the first position parameter identifies whether a sub-image block obtained by partitioning an image block is a rectangle or not a rectangle, and the second position parameter identifies endpoint information of the sub-image block; and a sub-image block determination unit 1102 configured to determine, according to the at least two position parameters and a decoding sequence of the at least two position parameters, information of the sub-image block obtained by partitioning the image block.

Specifically, the sub-image block determination unit 1102 includes: a sub-image block first determination subunit configured to determine which one of a horizontal partition manner and a vertical partition manner is selected for the image block according to the sequence of two position parameters and the first position parameter obtained during decoding, where during the decoding of the at least two position parameters, when the first numerical value obtained by the decoding is a preset first-type numerical value, the first numerical value is the first position parameter; and when the first numerical value obtained by the decoding is not the first-type numerical value or a second-type numerical value, and the decoded second numerical value is the preset first-type numerical value, the second numerical value is a first position parameter; and a sub-image block second determination subunit configured to determine the endpoint of the rectangle boundary according to the second position parameter and the first position parameter, where the rectangle boundary is not on the boundary of the image block.

Alternatively, the sub-image block determination unit 1102 includes: a sub-image block third determination subunit configured to: according to the sequence of two position parameters obtained during decoding, determine whether the partition manner at 45 degrees from upper right to lower left or the partition manner at 45 degrees from upper left to lower right is selected for the image block, where during the decoding of the at least two position parameters, when the absolute value of the first numerical value obtained by the decoding is a preset second-type numerical value, the first numerical value is a first position parameter; when the absolute value of the first numerical value obtained by the decoding is not a first-type numerical value or a second-type numerical value, and the absolute value of the decoded second numerical value is a preset second-type numerical value, the second numerical value is a first position parameter; a sub-image block fourth determination subunit configured to: when the absolute value of the first position parameter is a preset second-type numerical value, determine that one sub-image block obtained by partitioning an image block is a triangle; when a partition manner at 45 degrees from upper right to lower left is selected, determine that the triangle is located at the upper left corner or the lower right corner in the image block according to the sign of the first position parameter; and when a partition manner at 45 degrees from upper left to lower right is selected, determine that the triangle is located at the lower left corner or the upper right corner in the image block according to the sign of the first position parameter; and a sub-image block fifth determination subunit configured to determine endpoint information of the triangle boundary according to a position of the triangle in the image block and the second position parameter, where the triangle boundary is not on the boundary of the image block.

Alternatively, the sub-image block determination unit 1102 includes: a sub-image block sixth determination subunit configured to: according to the sequence of the two position parameters obtained during decoding, determine whether the partition manner at 45 degrees from upper right to lower left or the partition manner at 45 degrees from upper left to lower right is selected for the image block, where during the decoding of the at least two position parameters, when the first numerical value obtained by the decoding is a preset second-type numerical value, the first numerical value is a first position parameter; when the first numerical value obtained by the decoding is not a first-type numerical value or a second-type numerical value, and the decoded second numerical value is a preset second-type numerical value, the second numerical value is a first position parameter; a sub-image block seventh determination subunit configured to: when the first position parameter is a preset second-type numerical value, it is determined that one sub-image block obtained by partitioning an image block is a triangle; when the partition manner at 45 degrees from upper right to lower left is selected, according to the sign of the second position parameter, determine that the triangle is located at the upper left corner or the lower right corner in the image block; when the partition manner at 45 degrees from upper left to lower right is selected, according to the sign of the second position parameter, determine that the triangle is located at the lower left corner or the upper right corner in the image block; and a sub-image block eighth determination subunit configured to determine endpoint information of the triangle boundary according to a position of the triangle in the image block and an absolute value of the second position parameter, where the triangle boundary is not on the boundary of the image block.

The embodiment of the present invention selects at least two position parameters to identify a sub-image block obtained by partitioning an image block, in which the first position parameter identifies whether the sub-image block is a rectangle or not a rectangle, the second position parameter identifies endpoint information of the sub-image block; as the first position parameter only identifies whether the sub-image block is a rectangle or not a rectangle, the first position parameter may select one bit, so that the bit count needed for a parameter for identifying a sub-image block obtained by partitioning an image block is reduced.

Figure 12:
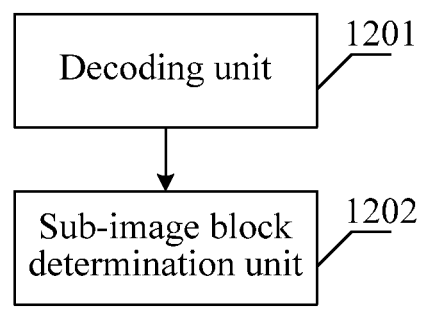
FIG. 12 is a structural view of an image decoding device provided in another embodiment of the present invention.

Referring to FIG. 12, another embodiment of the present invention provides an image decoding device, which includes: a decoding unit 1201 configured to acquire a bitstream and decode at least two position parameters from the bitstream, where the at least two position parameters include a first position parameter and a second position parameter, the absolute value of the first position parameter and the absolute value of the second position parameter each identify the distance from an endpoint of a boundary of the sub-image block to a corresponding reference endpoint, the boundary of the sub-image block is not on a boundary of the image block, the corresponding reference endpoint is an endpoint on the image block that is located on a same boundary as the endpoint of the boundary of the sub-image block, and the sign of the first position parameter and the sign of the second position parameter jointly identify the position of the sub-image block in the image block; and a sub-image block determination unit 1202 configured to determine, according to the at least two position parameters, information of the sub-image block obtained by partitioning the image block.

The sub-image block determination unit 1202 includes: a sub-image block determination subunit 1 configured to: when both the absolute value of the first position parameter and the absolute value of the second position parameter are not zero, determine that one sub-image block obtained by partitioning the image block is a triangle and another sub-image block is a pentagon; a sub-image block determination subunit 2 configured to determine the position of the triangle in the image block according to the sign of the first position parameter and the sign of the second position parameter; and a sub-image block determination subunit 3 configured to: according to the absolute value of the first position parameter, the absolute value of the second position parameter, and the position of the triangle in the image block, determine endpoint information of the triangle boundary, where the triangle boundary is not on a boundary of the image block.

When both the absolute value of the first position parameter and the absolute value of the second position parameter are 0, the at least two position parameters further include a third position parameter.

The sub-image block determination unit further includes: a sub-image block determination subunit 4 configured to: when both the absolute value of the first position parameter and the absolute value of the second position parameter are 0, according to the third position parameter, determine whether the partition manner at 45 degrees from upper right to lower left or the partition manner at 45 degrees from upper left to lower right is selected for the image block.

The embodiment of the present invention selects at least two position parameters to identify a sub-image block obtained by partitioning an image block, in which the absolute values of the two position parameters identify the distance from an endpoint of a boundary of the sub-image block to a corresponding reference endpoint, the boundary of the sub-image block is not on a boundary of the image block, the signs of the two position parameters jointly identify the position of the sub-image block in the image block, and by using the two position parameters, instead of being limited to an angle like 45 degrees, any partition type may be identified when a partition manner from lower right to upper left or from lower left to upper right is selected.

Persons of ordinary skill in the art may understand that all or part of steps in the method of the foregoing embodiments may be implemented by programs instructing relevant hardware, and the programs may be stored in a computer readable storage medium, such as a Read-Only Memory (ROM), a magnetic disc, or an optical disc.

The handover control method, apparatus, and system according to the embodiments of the present invention are described in detail above. The principle and implementation of the present invention are described herein through specific examples. The description about the embodiments of the present invention is merely provided for ease of understanding of the method and core ideas of the present invention. Persons of ordinary skill in the art can make variations and modifications to the present invention in terms of the specific implementations and application scopes according to the ideas of the present invention. Therefore, the specification shall not be construed as a limit to the present invention.

What is claimed is:

1. An image encoding method comprising:
    determining at least two position parameters for a sub-image block, wherein the sub-image block is obtained by partitioning an image block, wherein the at least two position parameters comprise a first position parameter and a second position parameter, wherein the first position parameter identifies whether the sub-image block is a rectangle or not a rectangle, and wherein the second position parameter identifies endpoint information for the sub-image block;
    determining an encoding sequence of the first position parameter and the second position parameter according to a partition mariner of the image block, wherein determining the encoding sequence of the first position parameter and the second position parameter according to the partition manner of the image block comprises determining an encoding order of whether the first position parameter precedes the second position parameter or the second position parameter precedes the first position parameter according to the partition manner of the image block; and
    encoding the at least two position parameters according to the determined encoding sequence.

2. The method according to claim 1, wherein determining the at least two position parameters for the sub-image block comprises:
    when a horizontal partition manner or a vertical partition manner for partitioning the image block is selected, determining that the first position parameter is a first-type numerical value, wherein the first-type numerical value indicates that the sub-image block is a rectangle; and
    determining the second position parameter according to the intersection information of the boundary of the image block and the rectangle boundary, wherein the rectangle boundary is obtained by partitioning.

3. The method according to claim 2, wherein encoding the at least two position parameters for the sub-image block according to the determined encoding sequence comprises using one bit to separately encode the first position parameter, the absolute value of the second position parameter, and the sign of the second position parameter according to the determined encoding sequence.

4. The method according to claim 1, wherein determining the encoding sequence of the first position parameter and the second position parameter according to the partition manner of the image block comprises determining the encoding sequence of the first position parameter and the second position parameter according to which one of a horizontal partition manner and a vertical partition manner is selected for partitioning.

5. The method according to claim 1, wherein determining the at least two position parameters for the sub-image block comprises:
when a partition manner at 45 degrees from upper right to lower left or a partition manner at 45 degrees from upper left to lower right is selected for partitioning, determining that an absolute value of the first position parameter is a second-type numerical value;
when the partition manner at 45 degrees from upper right to lower left is selected for partitioning, determining a sign of the first position parameter according to which one of the sub-image block at the upper left corner and the sub-image block at the lower right corner in the image block is a triangle;
when the partition manner at 45 degrees from upper left to lower right is selected for partitioning, determining a sign of the first position parameter according to which one of the sub-image block at the lower left corner and the sub-image block at the upper right corner in the image block is a triangle; and
determining the second position parameter according to intersection information of a boundary of the image block and a triangle boundary, wherein the triangle boundary is obtained by partitioning.

6. The method according to claim 5, wherein determining the encoding sequence of the first position parameter and the second position parameter according to the partition manner of the image block comprises determining the encoding sequence of the first position parameter and the second position parameter according to which one of the partition manner at 45 degrees from upper right to lower left and the partition manner at 45 degrees from upper left to lower right is selected for partitioning.

7. The method according to claim 5, wherein encoding the at least two position parameters for the sub-image block according to the determined encoding sequence comprises using one bit to separately encode the absolute value of the first position parameter, the second position parameter, and the sign of the first position parameter according to the determined encoding sequence.

8. The method according to claim 1, wherein determining the at least two position parameters for the sub-image block comprises:
when a partition manner at 45 degrees from upper right to lower left or a partition manner at 45 degrees from upper left to lower right is selected for partitioning, determining that the first position parameter is a second-type numerical value, wherein the second-type numerical value indicates that a sub-image block is a triangle;
when the partition manner at 45 degrees from upper right to lower left is selected for partitioning, determining a sign of the second position parameter according to which one of the sub-image block at the upper left corner and the sub-image block at the lower right corner in the image block is a triangle;
when the partition manner at 45 degrees from upper left to lower right is selected for partitioning, determining the sign of the second position parameter according to which one of the sub-image block at the lower left corner and the sub-image block at the upper right corner in the image block is a triangle; and
determining an absolute value of the second position parameter according to the intersection information of the boundary of the image block and the triangle boundary, wherein the triangle boundary is obtained by partitioning.

9. The method according to claim 1, wherein the first position parameter or the second position parameter comprises a sign that identifies the position of the sub-image block in the image block.

10. An image decoding method comprising:
acquiring a bitstream;
decoding at least two position parameters from the bitstream, wherein the at least two position parameters comprise a first position parameter and a second position parameter, wherein the first position parameter identifies whether a sub-image block obtained by partitioning an image block is a rectangle or not a rectangle, wherein the second position parameter identifies endpoint information of the sub-image block, and wherein the first position parameter and the second position parameter are encoded in an encoding order determined by a partition manner of the image block, wherein the encoding order determined by the partition manner of the image block comprises the first position parameter preceding the second position parameter or the second position parameter preceding the first position parameter according the partition manner of the image block; and
determining information of the sub-image block obtained by partitioning the image block according to the at least two position parameters and a decoding sequence corresponding to the encoding order of the at least two position parameters.

11. The method according to claim 10, wherein determining the information of the sub-image block obtained by partitioning the image block comprises:
determining which one of a horizontal partition manner and a vertical partition manner is selected for partitioning the image block according to a sequence of the two position parameters obtained during decoding and the first position parameter, wherein during the decoding of the at least two position parameters, the first numerical value is determined to be the first position parameter when a first numerical value obtained by the decoding is a preset first-type numerical value, the second numerical value is determined to be the first position parameter when the first numerical value obtained by the decoding is not the first-type numerical value or a second type numerical value, and a decoded second numerical value is the preset first-type numerical value; and
determining the endpoint of a rectangle boundary according to the second position parameter and the first position parameter, wherein the rectangle boundary is obtained by partitioning.

12. The method according to claim 10, wherein determining the information of the sub-image block obtained by partitioning the image block comprises:
determining which one of a partition manner at 45 degrees from upper right to lower left and a partition manner at 45 degrees from upper left to lower right is selected for partitioning the image block according to the sequence of the two position parameters obtained during decoding and the first position parameter, wherein during the decoding of the at least two position parameters, the first numerical value is determined to be the first position parameter when an absolute value of a first numerical value obtained by the decoding is a preset second-type numerical value, the second numerical value is determined to be the first position parameter when the absolute value of the first numerical value obtained by the decoding is not a first-type numerical value or a second-type numerical value, and an absolute value of a decoded second numerical value is the preset second-type numerical value;

determining that one sub-image block obtained by partitioning an image block is a triangle when the absolute value of the first position parameter is the preset second-type numerical value;

determining that the triangle is located at the upper left corner or the lower right corner in the image block according to a sign of the first position parameter when the partition manner at 45 degrees from upper right to lower left is selected;

determining that the triangle is located at the lower left corner or the upper right corner in the image block according to the sign of the first position parameter when the partition manner at 45 degrees from upper left to lower right is selected; and determining, according to a position of the triangle in the image block and the second position parameter, endpoint information of a triangle boundary, wherein the triangle boundary is obtained by partitioning.

13. The method according to claim 12, wherein a code word corresponding to the first position parameter in the bitstream comprises:

a one bit code word that corresponds to the sign of the first position parameter; and a code word that corresponds to the absolute value of the first position parameter.

14. The method according to claim 10, wherein determining the information of the sub-image block obtained by partitioning the image block comprises:

determining which one of a partition manner at 45 degrees from upper right to lower left and a partition manner at 45 degrees from upper left to lower right is selected for the image block according to the sequence of the two position parameters obtained during decoding and the first position parameter, wherein during the decoding of the at least two position parameters, the first numerical value is determined to be the first position parameter when a first numerical value obtained by the decoding is a preset second-type numerical value, the second numerical value is determined to be the first position parameter when the first numerical value obtained by the decoding is not a first-type numerical value or a second-type numerical value, and a decoded second numerical value is a preset second-type numerical value;

determining that one sub-image block obtained by partitioning the image block is a triangle when the first position parameter is the preset second-type numerical value;

determining that the triangle is located at the upper left corner or the lower right corner in the image block according to a sign of the second position parameter when the partition manner at 45 degrees from upper right to lower left is selected;

determining that the triangle is located at the lower left corner or the upper right corner in the image block according to the sign of the second position parameter when the partition manner at 45 degrees from upper left to lower right is selected; and determining endpoint information of a triangle boundary according to the position of the triangle in the image block and an absolute value of the second position parameter, wherein the triangle boundary is obtained by partitioning.

15. The method according to claim 10, wherein a code word corresponding to the second position parameter in the bitstream comprises:

a one bit code word that corresponds to the sign of the second position parameter; and a code word that corresponds to the absolute value of the second position parameter.

16. The method according to claim 10, wherein the first position parameter or the second position parameter comprises a sign that identifies the position of the sub-image block in the image block.

17. An image encoding device comprising:

a parameter determination unit configured to determine at least two position parameters for a sub-image block obtained by partitioning an image block, wherein the at least two position parameters comprise a first position parameter and a second position parameter, wherein the first position parameter identifies whether the sub-image block is a rectangle or not a rectangle, and wherein the second position parameter identifies endpoint information of the sub-image block;

an encoding sequence determination unit configured to determine an encoding sequence of the first position parameter and the second position parameter according to a partition manner of the image block, wherein the encoding sequence of the first position parameter and the second position parameter is determined according to the partition manner of the image block comprises determining an encoding order of whether the first position parameter precedes the second position parameter or the second position parameter precedes the first position parameter according to the partition manner of the image block; and an encoding unit configured to encode the at least two position parameters according to the determined encoding sequence.

18. The device according to claim 17, wherein the parameter determination unit comprises a first parameter determination subunit configured to:

when a horizontal partition manner or a vertical partition manner is selected, determine that the first position parameter is a first-type numerical value, wherein the first-type numerical value indicates that the sub-image block obtained by partitioning the image block is a rectangle; and determine the second position parameter according to intersection information of a boundary of the image block and a rectangle boundary, wherein the rectangle boundary is obtained by partitioning.

19. The device according to claim 18, wherein the encoding sequence determination unit comprises a first encoding sequence determination subunit configured to determine the encoding sequence of the first position parameter and the second position parameter according to which one of the horizontal partition manner and the vertical partition manner is selected.

20. The device according to claim 18, wherein the encoding unit is configured to, according to the determined encoding sequence, use one bit to separately encode the first position parameter, the absolute value of the second position parameter, and the sign of the second position parameter.

21. The device according to claim 17, wherein the parameter determination unit comprises:

a second parameter determination subunit configured to determine that an absolute value of the first position parameter is a second-type numerical value when a partition manner at 45 degrees from upper right to lower left or a partition manner at 45 degrees from upper left to lower right is selected;

a third parameter determination subunit configured to:
determine a sign of the first position parameter according to which one of the sub-image block at the upper left corner and the sub-image block at the lower right corner in the image block is a triangle when the partition manner at 45 degrees from upper right to lower left is selected; and determine the sign of the first position parameter according to which one of the sub-image block at the lower left corner and the sub-image block at the upper right corner in the image block is a triangle when the partition manner at 45 degrees from upper left to lower right is selected for partition; and a fourth parameter determination subunit configured to determine the second position parameter according to intersection information of a boundary of the image block and a triangle boundary, wherein the triangle boundary is obtained by partitioning.

22. The device according to claim 21, wherein the encoding sequence determination unit comprises a second encoding sequence determination subunit configured to determine the encoding sequence of the first position parameter and the second position parameter according to which one of the partition manner at 45 degrees from upper right to lower left and the partition manner at 45 degrees from upper left to lower right is selected.

23. The device according to claim 21, wherein the encoding unit is configured to, according to the determined encoding sequence, use one bit to separately encode the absolute value of the first position parameter, the second position parameter, and the sign of the first position parameter.

24. The device according to claim 17, wherein the parameter determination unit comprises:
a fifth parameter determination subunit configured to determine first position parameter is a second-type numerical value when a partition manner at 45 degrees from upper right to lower left or a partition manner at 45 degrees from upper left to lower right is selected;

a sixth parameter determination subunit configured to:
determine a sign of the second position parameter according to which one of the sub-image block at the upper left corner and the sub-image block at the lower right corner in the image block is a triangle when a partition manner at 45 degrees from upper right to lower left is selected; and determine the sign of the second position parameter according to which one of the sub-image block at the lower left corner and the sub-image block at the upper right corner in the image block is a triangle when a partition manner at 45 degrees from upper left to lower right is selected; and a seventh parameter determination subunit configured to determine an absolute value of the second position parameter according to intersection information of a boundary of the image block and a triangle boundary, wherein the triangle boundary is obtained by partitioning.

25. The device according to claim 17, wherein the first position parameter or the second position parameter comprises a sign that identifies the position of the sub-image block in the image block.

26. An image decoding device comprising:
a decoding unit configured to acquire a bitstream and decode at least two position parameters from the bitstream, wherein the at least two position parameters comprise a first position parameter and a second position parameter, wherein the first position parameter identifies whether a sub-image block obtained by partitioning an image block is a rectangle or not a rectangle, wherein the second position parameter identifies endpoint information of the sub-image block, and wherein the first position parameter and the second position parameter are encoded in an encoding order determined by a partition manner of the image block, wherein the encoding order determined by the partition manner of the image block comprises the first position parameter preceding the second position parameter or the second position parameter preceding the first position parameter according to the partition manner of the image block; and a sub-image block determination unit configured to determine, according to the at least two position parameters and a decoding sequence corresponding to the encoding order of the at least two position parameters, information of the sub-image block obtained by partitioning the image block.

27. The device according to claim 26, wherein the sub-image block determination unit comprises:
a sub-image block first determination subunit configured to determine which one of a horizontal partition manner and a vertical partition manner is selected for partitioning the image block according to a sequence of the two position parameters obtained during decoding and the first position parameter, wherein during the decoding of the at least two position parameters, the first numerical value is determined to be the first position parameter when a first numerical value obtained by the decoding is a preset first-type numerical value, the second numerical value is determined to be the first position parameter when the first numerical value obtained by the decoding is not the first-type numerical value or a second-type numerical value, and a decoded second numerical value is the preset first-type numerical value; and a sub-image block second determination subunit configured to determine an endpoint of a rectangle boundary according to the second position parameter and the first position parameter, wherein the rectangle boundary is obtained by partitioning.

28. The device according to claim 26, wherein the sub-image block determination unit comprises:
a sub-image block third determination subunit configured to determine which one of a partition manner at 45 degrees from upper right to lower left and a partition manner at 45 degrees from upper left to lower right is selected for partitioning the image block according to the sequence of two position parameters obtained during decoding, wherein during the decoding of the at least two position parameters, the first numerical value is determined to be the first position parameter when an absolute value of a first numerical value obtained by the decoding is a preset second-type numerical value, the second numerical value is determined to be the first position parameter when the absolute value of a first numerical value obtained by the decoding is not a first-type numerical value or a second-type numerical value, and an absolute value of a decoded second numerical value is a preset second-type numerical value;

a sub-image block fourth determination subunit configured to:

determine that one sub-image block obtained by partitioning the image block is a triangle when the absolute value of the first position parameter is a preset second-type numerical value;

determine that the triangle is located at the upper left corner or the lower right corner in the image block according to a sign of the first position parameter when the partition manner at 45 degrees from upper right to lower left is selected;

determine that the triangle is located at the lower left corner or the upper right corner in the image block according to the sign of the first position parameter when the partition manner at 45 degrees from upper left to lower right is selected; and a sub-image block fifth determination subunit configured to determine endpoint information of a triangle boundary according to a position of the triangle in the image block and the second position parameter, wherein the triangle boundary is obtained by partitioning.

29. The device according to claim 26, wherein the sub-image block determination unit comprises:

a sub-image block sixth determination subunit configured to determine whether the partition manner at 45 degrees from upper right to lower left or the partition manner at 45 degrees from upper left to lower right is selected for partitioning the image block according to the sequence of two position parameters obtained through decoding, wherein during the decoding of the at least two position parameters, the first numerical value is determined to be the first position parameter when a first numerical value obtained by the decoding is a preset second-type numerical value, the second numerical value is determined to be the first position parameter when a first numerical value obtained by the decoding is not a first-type numerical value or a second-type numerical value, and a decoded second numerical value is a preset second-type numerical value;

a sub-image block seventh determination subunit configured to:

when the first parameter is a preset second-type numerical value, determine that one sub-image block obtained by partitioning an image block is a triangle;

when the partition manner at 45 degrees from upper right to lower left is selected, determine, according to a sign of the second position parameter, that the triangle is located at the upper left corner or the lower right corner in the image block; and when the partition manner at 45 degrees from upper left to lower right is selected, determine, according to the sign of the second position parameter, that the triangle is located at the lower left corner or the upper right corner in the image block; and a sub-image block eighth determination subunit configured to determine endpoint information of a triangle boundary according to a position of the triangle in the image block and an absolute value of the second position parameter, wherein the triangle boundary is obtained by partitioning.

30. The device according to claim 26, wherein the first position parameter or the second position parameter comprises a sign that identifies the position of the sub-image block in the image block.

* * * * *

UNITED STATES PATENT AND TRADEMARK OFFICE
CERTIFICATE OF CORRECTION

| | | |
|---|---|---|
| PATENT NO. | : 8,891,889 B2 | |
| APPLICATION NO. | : 13/848301 | |
| DATED | : November 18, 2014 | |
| INVENTOR(S) | : Haoping Yu et al. | |

It is certified that error appears in the above-identified patent and that said Letters Patent is hereby corrected as shown below:

In the Claims

Column 32, Lines 8-30, Claim 10 should read:

An image decoding method comprising:
   acquiring a bitstream;
   decoding at least two position parameters from the bitstream, wherein the at least two position parameters comprise a first position parameter and a second position parameter, wherein the first position parameter identifies whether a sub-image block obtained by partitioning an image block is a rectangle or not a rectangle, wherein the second position parameter identifies endpoint information of the sub-image block, and wherein the first position parameter and the second position parameter are encoded in an encoding order determined by a partition manner of the image block, wherein the encoding order determined by the partition manner of the image block comprises the first position parameter preceding the second position parameter or the second position parameter preceding the first position parameter according to the partition manner of the image block; and
   determining information of the sub-image block obtained by partitioning the image block according to the at least two position parameters and a decoding sequence corresponding to the encoding order of the at least two position parameters.

Column 37, Lines 20-32 to Column 38, Lines 1-27, Claim 29 should read:

The device according to claim 26 wherein the sub-image block determination unit comprises:
   a sub-image block sixth determination subunit configured to determine whether the partition manner at 45 degrees from upper right to lower left or the partition manner at 45 degrees from upper left to lower right is selected for partitioning the image block according to the sequence of two position parameters obtained through decoding, wherein during the decoding of the at least two position parameters, the first numerical value is determined to be the first position parameter when a first numerical value obtained by the decoding is a preset second-type numerical value, the second numerical value is determined to be the first position parameter when a first numerical value obtained Signed and Sealed this
Third Day of March, 2015

Michelle K. Lee
*Deputy Director of the United States Patent and Trademark Office* by the decoding is not a first-type numerical value or a second-type numerical value, and a decoded second numerical value is a preset second-type numerical value;

a sub-image block seventh determination subunit configured to:

when the first parameter is a preset second-type numerical value, determine that one sub-image block obtained by partitioning an image block is a triangle;

when the partition manner at 45 degrees from upper right to lower left is selected, determine, according to a sign of the second position parameter, that the triangle is located at the upper left corner or the lower right corner in the image block; and when the partition manner at 45 degrees from upper left to lower right is selected, determine, according to the sign of the second position parameter, that the triangle is located at the lower left corner or the upper right corner in the image block; and a sub-image block eighth determination subunit configured to determine endpoint information of a triangle boundary according to a position of the triangle in the image block and an absolute value of the second position parameter, wherein the triangle boundary is obtained by partitioning.